US012415234B2

(12) United States Patent
Coates et al.

(10) Patent No.: US 12,415,234 B2
(45) Date of Patent: Sep. 16, 2025

(54) MATERIAL PROCESSING METHODS AND RELATED APPARATUS

(71) Applicant: Hybrid Manufacturing Technologies Limited, Leicestershire (GB)

(72) Inventors: Peter Coates, Sutton Coldfield (GB); Jason B. Jones, Fairview, TX (US)

(73) Assignee: Hybrid Manufacturing Technologies Limited, Leicestershire (GB)

( * ) Notice: Subject to any disclaimer, the term of this patent is extended or adjusted under 35 U.S.C. 154(b) by 1060 days.

(21) Appl. No.: 16/868,509

(22) Filed: May 6, 2020

(65) Prior Publication Data

US 2020/0331062 A1 Oct. 22, 2020

Related U.S. Application Data

(63) Continuation of application No. 15/317,933, filed as application No. PCT/GB2015/051689 on Jun. 9, 2015, now abandoned.

(30) Foreign Application Priority Data

Jun. 9, 2014 (GB) ........................................ 1410229
Jul. 18, 2014 (GB) ........................................ 1412843
(Continued)

(51) Int. Cl.
*B23Q 3/157* (2006.01)
*B22F 10/25* (2021.01)
(Continued)

(52) U.S. Cl.
CPC ............ *B23K 26/342* (2015.10); *B22F 10/32* (2021.01); *B22F 10/38* (2021.01); *B22F 12/38* (2021.01);
(Continued)

(58) Field of Classification Search
CPC ............ Y10T 483/17; B23Q 2220/008; B23Q 11/08–11/0891;
(Continued)

(56) References Cited

U.S. PATENT DOCUMENTS 2,886,695 A 5/1959 Todd
3,865,297 A 2/1975 Stiefel et al.
(Continued)

FOREIGN PATENT DOCUMENTS

CN 101541511 A 9/2009
CN 101642810 A 2/2010
(Continued)

OTHER PUBLICATIONS

Andreas Grindeland, "Improved Inert Gas Protection for Laser Weld and Metal Deposition Processes", Volvo Aero vols. 10128484; Feb. 2011.*
(Continued)

*Primary Examiner* — Erica E Cadugan
(74) *Attorney, Agent, or Firm* — Alliance IP, LLC

(57) ABSTRACT

The application describes a machine tool adapted and arranged to carry out removal and addition of material on a work piece located in a work station, the machine having a first head arranged to remove material from the work piece and at least a second head arranged to process the work piece, each of the first and second heads being arranged to be moveable in at least two axes and preferably in 3, 4 or 5 axes and wherein the machine is arranged to control an environment of the work station. The work station is at least partially sealable. The machine has a clean side and a dirty side. Novel processing heads particularly adapted for use in the new machine tool are disclosed. These may also be retrofitted to CNC machines. The novel heads include heads adapted to carry out two processes simultaneously. Heads (Continued)

adapted to carry out heat and pressure treatment are also disclosed. Use of the processing heads to carry out analysis in manufacturing steps is disclosed as is the provision and use of heads that can carry out analysis as well as processing.

20 Claims, 34 Drawing Sheets

(30) Foreign Application Priority Data

Dec. 31, 2014 (GB) .................................. 1423407
Apr. 10, 2015 (GB) .................................. 1506154

(51) Int. Cl.

| | | |
|---|---|---|
| B22F 10/32 | (2021.01) | |
| B22F 10/38 | (2021.01) | |
| B22F 12/00 | (2021.01) | |
| B22F 12/90 | (2021.01) | |
| B23C 1/00 | (2006.01) | |
| B23C 1/08 | (2006.01) | |
| B23K 26/00 | (2014.01) | |
| B23K 26/12 | (2014.01) | |
| B23K 26/16 | (2006.01) | |
| B23K 26/342 | (2014.01) | |
| B23P 23/04 | (2006.01) | |
| B23Q 1/00 | (2006.01) | |
| B23Q 1/01 | (2006.01) | |
| B23Q 3/155 | (2006.01) | |
| B23Q 11/00 | (2006.01) | |
| B23Q 11/08 | (2006.01) | |
| B23Q 17/00 | (2006.01) | |
| B29C 64/25 | (2017.01) | |
| B29C 64/371 | (2017.01) | |
| B33Y 30/00 | (2015.01) | |

(52) U.S. Cl.
CPC ............... *B23C 1/002* (2013.01); *B23C 1/08* (2013.01); *B23K 26/0093* (2013.01); *B23K 26/123* (2013.01); *B23K 26/127* (2013.01); *B23K 26/16* (2013.01); *B23P 23/04* (2013.01); *B23Q 1/0009* (2013.01); *B23Q 1/012* (2013.01); *B23Q 3/15506* (2013.01); *B23Q 3/15539* (2016.11); *B23Q 11/0042* (2013.01); *B23Q 11/0046* (2013.01); *B23Q 11/0891* (2013.01); *B23Q 17/00* (2013.01); *B29C 64/25* (2017.08); *B29C 64/371* (2017.08); *B33Y 30/00* (2014.12); *B22F 10/25* (2021.01); *B22F 12/90* (2021.01); *B22F 2999/00* (2013.01); *B23Q 11/0825* (2013.01); *B23Q 2220/008* (2013.01); *Y02P 10/25* (2015.11); *Y10T 409/30392* (2015.01); *Y10T 409/307168* (2015.01); *Y10T 409/308288* (2015.01); *Y10T 483/115* (2015.01); *Y10T 483/17* (2015.01); *Y10T 483/1736* (2015.01); *Y10T 483/1795* (2015.01); *Y10T 483/1845* (2015.01)

(58) Field of Classification Search
CPC ........ B23Q 11/0042–11/0075; B23K 26/0093; B23K 26/34–26/342; B23K 26/12–26/128; B23K 26/16; B23P 23/04; B33Y 10/00; B33Y 30/00; B33Y 40/00
USPC .......................................................... 483/16
See application file for complete search history.

(56) References Cited

U.S. PATENT DOCUMENTS

| | | | |
|---|---|---|---|
| 4,145,802 A | 3/1979 | d'Auria | |
| 4,492,843 A | 1/1985 | Miller et al. | |
| 4,620,362 A | 11/1986 | Reynolds | |
| 4,621,762 A | 11/1986 | Bronowski | |
| 4,645,901 A | 2/1987 | Scholz et al. | |
| 4,724,299 A | 2/1988 | Hammeke | |
| 4,750,947 A * | 6/1988 | Yoshiwara | B23K 26/32 219/121.85 |
| 4,773,815 A | 9/1988 | Lemelson | |
| 4,814,575 A | 3/1989 | Petitbon | |
| 5,073,694 A | 12/1991 | Tessier et al. | |
| 5,207,371 A | 5/1993 | Prinz et al. | |
| 5,208,431 A | 5/1993 | Uchiyama et al. | |
| 5,304,771 A | 4/1994 | Griffin et al. | |
| 5,512,726 A | 4/1996 | Arantes et al. | |
| 5,554,837 A * | 9/1996 | Goodwater | B23K 26/034 219/121.64 |
| 5,890,849 A * | 4/1999 | Cselle | B23Q 11/1046 408/1 R |
| 5,906,760 A | 5/1999 | Robb et al. | |
| 5,919,120 A | 7/1999 | Pumphrey | |
| 6,326,585 B1 * | 12/2001 | Aleshin | B23K 26/032 219/121.84 |
| 6,342,687 B1 | 1/2002 | Sukhman et al. | |
| 6,774,338 B2 | 8/2004 | Baker et al. | |
| 7,020,539 B1 | 3/2006 | Kovacevic et al. | |
| 7,045,738 B1 | 5/2006 | Kovacevic et al. | |
| 7,462,143 B2 | 12/2008 | Hackman | |
| 7,939,003 B2 | 5/2011 | Bonassar et al. | |
| 8,160,738 B2 | 4/2012 | Nishikawa et al. | |
| 8,546,717 B2 | 10/2013 | Stecker | |
| 9,586,298 B2 | 3/2017 | Jones et al. | |
| 9,964,944 B2 | 5/2018 | Adair et al. | |
| 10,464,165 B2 | 11/2019 | Kamigawara et al. | |
| 2005/0184032 A1 | 8/2005 | Yamazaki et al. | |
| 2005/0248065 A1 | 11/2005 | Owada | |
| 2005/0263505 A1 | 12/2005 | Yamazaki et al. | |
| 2006/0169679 A1 | 8/2006 | Sato et al. | |
| 2006/0266740 A1 | 11/2006 | Sato et al. | |
| 2007/0000888 A1 | 1/2007 | Yamazaki et al. | |
| 2007/0115309 A1 | 5/2007 | Miura et al. | |
| 2007/0271757 A1 | 11/2007 | Nagahama et al. | |
| 2008/0221725 A1 | 9/2008 | Wakazono | |
| 2009/0314136 A1 | 12/2009 | Culf | |
| 2010/0031882 A1 | 2/2010 | Abe et al. | |
| 2011/0018445 A1 | 1/2011 | Horng et al. | |
| 2011/0282482 A1 | 11/2011 | Knighton | |
| 2011/0291331 A1 | 12/2011 | Scott | |
| 2012/0145683 A1 | 6/2012 | Miyagi et al. | |
| 2013/0197683 A1 | 8/2013 | Zhang et al. | |
| 2013/0295338 A1 | 11/2013 | Keating et al. | |
| 2014/0061170 A1 | 3/2014 | Lindsay et al. | |
| 2014/0117586 A1 | 5/2014 | Bonassar et al. | |
| 2014/0167326 A1 | 6/2014 | Jones et al. | |
| 2014/0252684 A1 | 9/2014 | Swanson et al. | |
| 2015/0060422 A1 * | 3/2015 | Liebl | B23K 26/1464 219/121.78 |
| 2015/0183070 A1 | 7/2015 | Jones et al. | |
| 2015/0331412 A1 | 11/2015 | Adair et al. | |
| 2016/0105933 A1 * | 4/2016 | Jones | B23K 31/003 219/601 |
| 2017/0057011 A1 | 3/2017 | Hyatt et al. | |
| 2017/0080537 A1 | 3/2017 | Schwenk et al. | |
| 2017/0129180 A1 | 5/2017 | Coates et al. | |
| 2017/0205806 A1 | 7/2017 | Chaphalkar et al. | |
| 2017/0209958 A1 * | 7/2017 | Soshi | B33Y 10/00 |
| 2018/0141174 A1 | 5/2018 | Mori et al. | |
| 2018/0326494 A1 | 11/2018 | Jemura et al. | |
| 2022/0234155 A1 * | 7/2022 | Riemensperger | B23Q 11/0075 |

FOREIGN PATENT DOCUMENTS

| | | |
|---|---|---|
| CN | 103878980 A | 6/2014 |
| DE | 4315537 A1 | 11/1993 |

(56) References Cited

FOREIGN PATENT DOCUMENTS

| | | | |
|---|---|---|---|
| DE | 202010007364 U1 | 8/2010 | |
| DE | 102013207523 A1 | 10/2014 | |
| EP | 0529816 A1 | 3/1993 | |
| EP | 0790875 A1 | 8/1997 | |
| EP | 0895850 A1 | 2/1999 | |
| EP | 0967067 A1 | 12/1999 | |
| EP | 1568438 A1 | 8/2005 | |
| EP | 1614497 A1 | 1/2006 | |
| EP | 1634694 A2 | 3/2006 | |
| JP | 861164738 A | 7/1986 | |
| JP | 863174837 A | 7/1988 | |
| JP | H07186277 A | 7/1995 | |
| JP | H10501463 A | 2/1998 | |
| JP | 2003025183 A | 1/2003 | |
| JP | 2003320471 A | 11/2003 | |
| JP | 2003340871 A | 12/2003 | |
| JP | 2005013275 A | 1/2005 | |
| JP | 2005103734 A | 4/2005 | |
| JP | 2005186180 A | 7/2005 | |
| JP | 2005238253 A | 9/2005 | |
| JP | 2006255887 A | 9/2006 | |
| JP | 2013043338 A | 3/2013 | |
| WO | 9015375 A1 | 12/1990 | |
| WO | 9520458 A1 | 8/1995 | |
| WO | 9710067 A1 | 3/1997 | |
| WO | 02073324 A2 | 9/2002 | |
| WO | 2006020685 A2 | 2/2006 | |
| WO | 2012079725 A1 | 6/2012 | |
| WO | 2013079275 A1 | 6/2013 | |
| WO | 2014013247 A2 | 1/2014 | |
| WO | 2014165735 A1 | 10/2014 | |
| WO | 2014197732 A2 | 12/2014 | |
| WO | 2015012992 A2 | 1/2015 | |
| WO | 2015073367 A1 | 5/2015 | |
| WO | WO-2016/017069 A1 * | 2/2016 | |

OTHER PUBLICATIONS

Stephanie Hendrixson, "Inert versus Open Atmosphere for Laser Metal Deposition", article from "Additive Manufacturing" from https://www.additivemanufacturing.media/articles/inert-versus-open-atmosphere-for-laser-metal-deposition; published Dec. 12, 2016.*
European Communication Pursuant to Article 94(3) EPC in European Application Serial No. 13750363.7 mailed on May 24, 2017.
First Office Action for Chinese Patent Application No. CN2013800382118, mailed on May 31, 2016.
International Preliminary Report on Patentability for Application No. PCT/GB2013/051906, mailed on Jan. 20, 2015, 13 pages.
International Preliminary Report on Patentability in PCT International Application No. PCT/GB2015/051689 mailed on Dec. 15, 2016, 12 pages.
International Search Report and Written Opinion for Application No. PCT/GB2015/051689, mailed on Nov. 27, 2015, 17 pages.
Japan Patent Office, Notice of Reasons for Rejection issued in JP Patent Application No. 2017-517429, mailed Apr. 23, 2019; 11 pages including English translation.
Notification of Transmittal of the International Search Report and Written Opinion for Application No. PCT/GB2013/051906, mailed on Mar. 3, 2014.
Office Action mailed May 19, 2015 for U.S. Appl. No. 14/566,542, filed Dec. 10, 2014.
Restriction Requirement mailed Nov. 26, 2018 for U.S. Appl. No. 14/407,056, filed Jul. 16, 2013, 8 pages.
State Intellectual Property Office of the People's Republic of China; Office Action issued in Chinese Patent Application No. CN 201580030751.0, dated Jul. 15, 2019; 8 pages including English translation.
State Intellectual Property Office, First Office Action and Search Report issued for CN Patent Application No. 201580030751.0; dated May 18, 2018; 14 pages including English translation.
United Kingdom Search Report for Patent Application No. GB1212629 dated Sep. 26, 2012.
United Kingdom Search Report for Patent Application No. GB1412843.3 mailed on Nov. 28, 2014.
United Kingdom Search Report for Patent Application No. GB1423407.4 mailed on Jul. 3, 2015.
United Kingdom Search Report for Patent Application No. GB81307796.1 dated Jun. 14, 2013.
Wang, Guoyong; "Numeral Control and Application," Chapter 4; published by the National Defense Industry Press; Aug. 31, 2012; 11 pages including English translation.
Zelinski, Peter, "Video: Additive/Subtractive Machining Cycle," Blog Post dated Dec. 18, 2013, available online at https://www.mmsonline.com/blog/post/video-additivesubtractive-machining-cycle Includes screenshots from the video.
EPO; Office Action issued in EP Patent Application No. 15729896.9, dated Feb. 22, 2021; 6 pages.
India Patent Office; Office Action issued in IN Patent Application No. 201627041144, dated Sep. 20, 2021; 6 pages including English translation.
Israel Patent Office; Office Action issued in Israeli Patent Application No. 249335, dated Jun. 2, 2020; 6 pages including English translation.
KIPO Notice of Final Rejection in KR Application Serial No. 10-2017-7000370 mailed on Mar. 31, 2022 (8 pages) with English Language Translation.
KIPO; Office Action issued in Korean Patent Application No. KR 10-2017-7000370, dated Apr. 27, 2021; 17 pages including English translation.
SIPO; Second Office Action issued in Chinese Patent Application No. CN 201580030751.0, dated Dec. 28, 2018; 9 pages including English translation.

* cited by examiner

Deposit material using first head 602

Select second processing head 606 and process

Deposit material using first head 602

Select second processing head 606 and process

Gaussian
(or Lorentzian)

Top Hat

Chair

Multi-mode

Custom

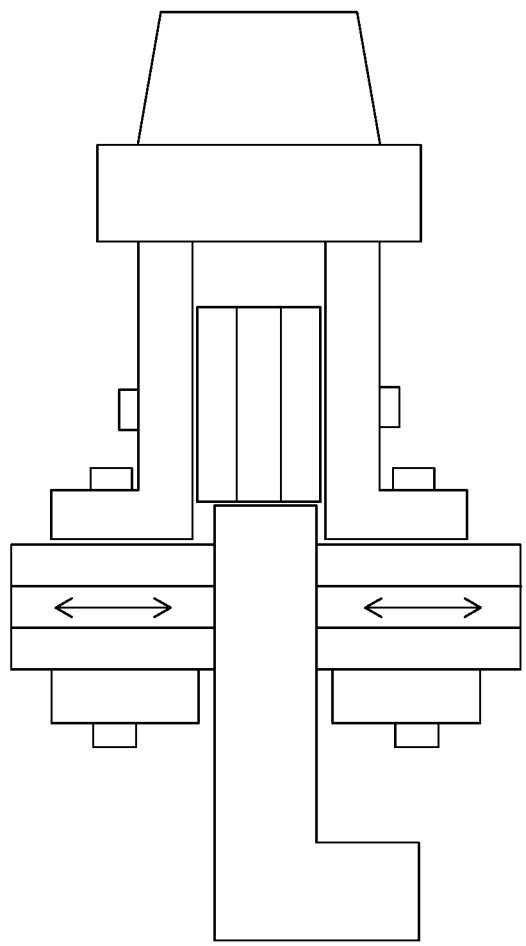
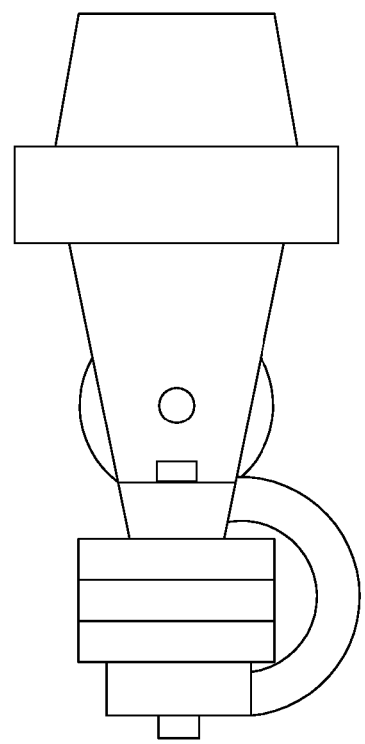
Fig. 32
Fig. 31

MATERIAL PROCESSING METHODS AND RELATED APPARATUS

CROSS-REFERENCE TO RELATED APPLICATIONS

This Application is a continuation (and claims the benefit of priority under 35 U.S.C. § 120) of U.S. application Ser. No. 15/317,933 with an effective filing date of Dec. 9, 2016 and entitled MATERIAL PROCESSING METHODS AND RELATED APPARATUS, which application is a national stage application under 35 U.S.C. § 371 of PCT International Application Serial No. PCT/GB2015/051689, filed on Jun. 9, 2015, which application claims the benefit of priority to GB Patent Application Serial No. GB 1410229.7, filed on Jun. 9, 2014; GB Patent Application Serial No. GB 1412843.3, filed on Jul. 18, 2014, GB Patent Application Serial No. 1423407.4 filed on Dec. 31, 2014; and GB Patent Application Serial No. 1506154.2 filed on Apr. 10, 2015. The disclosures of the prior applications are considered part of and are hereby incorporated by reference in their entirety in the disclosure of this application.

This invention relates to a method of processing materials and to an apparatus for carrying out the method. In particular the method and apparatus relate to additive manufacturing and CNC machining.

Additive manufacturing (AM) is a technology in which articles, or at least portions thereof, are manufactured, repaired, or the like, by adding material this may be via stand alone 3D printer, dedicated AM system or deposition using a robot, machine tool, or the like. Suitable apparatus for the provision of such additive manufacturing is shown in WO2014/013247 in the name of Ex Scintilla Ltd.

Material removal techniques, such as milling, and the like are also well known. Typically such material removal can be facilitated through the use of Computer Numerically Controlled (CNC) machines which automate the material removal process.

AM and CNC can be combined such that an article can be fabricated or repaired using AM and finished by having the surface processed using material removal, such as CNC material removal and this process is illustrated with reference to FIG. 1.

It is known to use a machine having a number of heads permanently connected to the tool and selectable to work on a work piece. Such arrangements increase the bulk and volume occupied by a machining head which restricts operation of the machining head. It is also known to It is also known to move a work piece from one work station to another which each work station carrying out a specific operation including additive steps and post deposition treatment and cutting.

It is known to provide arrangements that provide processing heads that can be fitted to existing machine-tools, such as multi-axis CNC milling machines. However the capabilities of such prior art processing-heads can be expanded as may be desired and improved heads are described in published application number WO/2014/013247, and also in unpublished application numbers: GB 1412843.3 and GB1423407.4 from which this application claims priority.

In the previous machines a suitable head has been designed and used in existing CNC machines as described in the previous applications. However it has been appreciated that disadvantages exist where an existing machine tool designed for milling is used for additive manufacturing. These disadvantages can be characterized in that milling machines are intended for shaping the outward surface of a part only. This is not surprising since the internal characteristics of the part are determined by the preparation of the starting billet from which a part is cut. The addition of material during additive manufacturing or 3D printing not only shapes the outward surface, but also forms key characteristics of the inward volume of the part (including microstructure) as it is made. As such it is desirable to be able to maintain the cleanest environment possible to avoid defect introduction during the build. Furthermore, to be able to provide quality assurance it is desirable to assess the internal volume of a part (including microstructure) as well as the surface topology and chemistry at nano, micro, meso and macro scale as the part or product is made in real-time or at least in situ.

According to a first aspect of the invention there is provided a machine adapted and arranged to carry out removal and addition of material on a work piece located in a work station, the machine having a first device arranged to remove material from the work piece and a second device arranged to process the work piece, each of the first and second devices being arranged to be moveable in at least two axes.

In some embodiments the first and second devices may each be moveable in 3, 4 or 5 axes.

Preferably the first device is a mechanism which comprises a first carriage on which a plurality of interchangeable delivery heads are processing heads which can be removably mounted in use and the interchangeable processing heads being storable in a first tool changer. Desirably the second device is a mechanism which comprises a second carriage on which a plurality of interchangeable delivery heads which are processing heads and machining heads which can be removably mounted, the removable processing heads for the second device being storable in a second tool changer.

The applicant has developed new and improved processing heads and methods of using those heads in existing machines. The applicant has also realized that the processing heads may be particularly useful in a machine specifically designed to take advantage of the features of the heads and the methods of using the heads that have been developed.

It will be appreciated that the processing head either be arranged to remove material from the work piece or may be otherwise arranged to process the work piece by addition or deposition of material or may be arranged to inspect or monitor the work piece. Such heads may be loosely referred to as processing heads. In some cases it will be appreciated that the processing head may be arranged to process the work pieces by heat treatment and may remove some of the material of the work piece in the processing. Other processing heads are arranged to remove material from the work piece.

Desirably each tool changer has a number of processing heads stored therein. The first tool changer preferably stores processing heads designed to remove material from a work piece. Such heads may be arranged to carry out milling, grinding, planning, boring, ablation, machining and other material removal processes as are well known in the art. The machining may be laser assisted and the processing head may utilise coaxial laser delivery or off-axis laser delivery.

The second tool changer preferably stores processing heads designed and arranged to process material on a work piece. Such heads are described in the earlier applications referred to above and include heads arranged to process the material of the work piece such as by depositing or modifying material or inspecting, detecting or marking the work piece being created such as with a galvo laser, cladding such as with a laser cladding head or a 90° laser cladding head, deposition such as by extrusion of a material including a 90° extrusion head, heat treatment, hammering, scarifying, shot blasting, peening or micro-peening, needle peening, laser peening or rolling. The heads may be arranged to carry out induction heating, metal inert gas welding (MIG welding), plasma arc transferred welding (PTA welding), apply a vacuum; to blow air onto the work piece; carry out laser assisted machining; apply a coating to the work piece such as with HVOF coating or use electrical discharge machining (EDM). The heads may also be arranged to lay down material using 3D manufacturing processes. Additionally the second tool changer may contain heads may be any one or more of the following: an image recording apparatus; lighting, either fixed or moving; touch probes; 3D surface (including laser and structured light varieties) and volumetric scanners, including confocal, focus variation, interferometry and structured light scanners; photogrammetry systems, sensors (such as oxygen sensors; thermal sensors; thermal cameras) eddy current generators, ultrasound transducers (for air, gel, and liquid coupled), electromagnetic wave generators, induction heating coils, electromagnet(s), a magnification device such as confocal microscope, incremental sheet forming tools, heat gun, vacuum, induction heater, galvanometer, oscilloscopes, digital mirror devices, structured light scanners, grinders, abrasives, right angle variations of heads, microscopes, confocal or variable microscopes, electromagnetic detectors including gamma and X-ray, spectrographs, etc.

Preferably each tool changer is adapted to store from 5 to 50 heads, or more preferably from 10 to 40 heads or most preferably from 25 to 35 heads. It will be appreciated however that as in common practice a tool changer can be expanded to store more heads if required.

Preferably the respective tool changers store the processing heads remote from the work piece. Such storage of the heads in a remote location from the work piece allows a larger number of heads to be stored and to be available for selection as well as prevents them from becoming contaminated from the work piece. Additionally as only the "in use" head is attached there is a greater range of movement available to the head relative to the work piece.

In a preferred embodiment the first carriage is parked while the second carriage is in use and vice versa.

Preferably the machine comprises a body having a clean side and a dirty side. Each side may comprise a chamber that may be sealable. Preferably at least the clean side comprises a sealable chamber. The clean side may comprise a chamber, such as a tool changer, in which clean heads are stored. The dirty side may comprise a chamber such as a tool changer, in which "dirty" heads are stored. Such "dirty" heads may be used for removal of material from a work piece. The first and second tool changers are preferably remote from the work station.

Desirably the machine is arranged to control an environment of the work station

Desirably the work station is located between the clean side and the dirty side. In a preferred embodiment the work station is at least semi protected. The work station may be provided in a chamber. The chamber may be sealed or may be sealable or partially sealable.

It may be possible to change an environment in the chamber of the work station to be a clean environment depending on the process being carried out. In some embodiments the work station may be provided in a chamber that can be flooded with an inert gas such as argon or nitrogen. In some embodiments the atmosphere in the chamber may be controlled to have a low oxygen content and/or to have a low level of particle contamination. An inert gas may flow through the chamber. In other embodiments the chamber may be sealable, and the work piece may be submerged in an inert gas. The inert gas may also be provided as a coolant.

In some embodiments the carriage may provide a means of supplying fluid to the chamber or to the work piece. The fluid may be a gas. The gas may be inert and/or may be acting as a coolant. In some cases the gas may assist in extraction of waste material. In other cases an inert atmosphere may be provided and a coolant gas may be supplied to the work piece in addition. Where the work piece is submerged in an inert gas, any waste material or coolant extraction preferably rises above the level of the inert gas so that upon extracting coolant and waste material, the inert gas is not expelled from the chamber. A waste extraction means may be provided. In a preferred embodiment an extraction point is provided which is connected to a duct in the machine. Preferably waste is removed by means of an Archimedes screw operating in the duct. This arrangement preferably extracts the coolant straight up the centre of the screw and out of the chamber, yet always leave a column of inert gas and fluid in the duct, which would provide a natural airtight barrier between the chamber and the atmosphere.

It is desirable to manage heat in the work piece. As material, particularly metal, is deposited the work piece gains in heat and this can cause problems such as distortion of the final part.

It is possible to manage heat in the work piece by alternating between deposition of metal and machining of the metal with a coolant. At least a part of the heat in the work piece transfers to the coolant which may be a gaseous or liquid cutting fluid. It will be appreciated that this method of operation is effective and can maintain the work piece at a temperature below approximately $\frac{1}{3}^{rd}$ of the melting point of the material, which maintains a level of stability in most materials. Such an alternation in steps may not be the optimal sequence for maximum productivity but does manage the temperature of the work piece and may be used in existing machine tools that are retro fitted with processing heads.

In some embodiments the chamber may be at least partially sealable. It is desirable in managing heat in the work piece that the work station is liquid cooled. Typically the work piece will be held in a work holding device on a platform in the work station. The platform or at least the work holding device may be cooled with a cooling liquid or gas such that heat generated by material deposition on the work piece is removed through conduction to the work holding device and into the cooling system. Advantages have been found in that the cooling enable higher work cycles to be maintained for deposition. Additionally the machine is insulated from the heat of the work piece which helps axes of the machine to maintain the accuracy that they are designed to hold and prevent damage due to thermal expansion of moving parts.

In other embodiments the chamber may be sealable and a vacuum may be applied to the sealed chamber such that material processing is carried out in a vacuum or under a pressure reduced from atmospheric. Alternatively it may be desirable to increase the pressure in the chamber above atmospheric pressure.

In some embodiments the chamber may be unitary on at least two, three, four or five sides. A lid or other sealing mechanism may be provided to seal the chamber. In other embodiments a sealing door may be provided. Preferably means for introducing a gas or applying a vacuum is provided in at least one face of the chamber or door.

In other embodiments the chamber may be partially open and may be provided with a local shielding. Such local shielding may be expelled openly, or preferably may be confined by using a bag, such as a plastic bag, or a skirt that can be located around the work piece during processing. The skirt could be supported on a plunger and the locating of the skirt around the work piece may be automated.

In a preferred embodiment the first and second devices are moveable in at least x, y and z axes. In a preferred embodiment the devices are slideable in at least one of the x, y and z axes. Preferably one of the slideable axes is in the x directions and a rail is provided which is common to the first and second devices. In some embodiments the first and second carriages are each mounted on respective first and second supports. The first and second supports are preferably each slideable in the rail so providing movement to the first and second carriages in the x direction. In a preferred embodiment each carriage is moveable in the z direction relative to the support. Desirably the movement of the first and second carriages on the first and second supports in the y direction is parallel.

In some embodiments the machine may be provided with further variation by control of orientation of a platform supporting the work piece. The platform may be fixed providing flat table or may be rotary or may in some cases be arranged to tilt as well as rotate.

The platform and the chamber are advantageously arranged to accommodate a work piece having a size as known in the art of machine tools.

Typically the machine is cuboid and overall size the footprint of the machine is from 1 m to 5 m or more preferably from 2 m to 4 m or most preferably about 3 m.

The machine is preferably optimized for high speed machining of light passes since the amount of heavy cutting, traditionally known as "roughing" would be reduced due to the addition of material which is near-net of the target shape and therefore a work piece will require mostly "finish machining".

Historically many of the processing and removal heads used to date have utilised a side docking system.

Preferably the machine provides an integrated docking system. The integrated docking system may deliver material and energy to a processing head on the first or second carriage which may be arranged to remove material from the work piece or may be arranged to process the work piece.

In a preferred embodiment the docking system is arranged to provide a clean connection between a processing head and the docking manifold on the machine. An operable seal may be provided on both halves of the mating manifold. Furthermore portions of the head which are sensitive to contamination, such as the optical windows for laser energy may be covered by a sliding or rotating door which is only opened after the head manifold and dock manifold mate, thereby eliminating the opportunity for contaminants to accumulate on said sensitive areas when the head or dock are in a storage position. Also, positioning of an air knife may be used to blow off any contaminants after the doors are closed to ensure the powder ports and other docking manifold connections may be kept clean.

Material delivered to the processing head may be in the form of powder, fluid, or filaments. In some embodiments the material may comprise a polymer material. In other embodiments the material may be selected from a group comprising metals, non-metals, polymers, ceramics, clay, salts, conductive, capacitive or dielectric materials, in powder form, filaments, rods, fibers (short, chopped, long, or continuous) sheets, or wires, in solid or semi- to fully liquid form. Alternatively materials can be provided in suspension in a liquid, emulsion, gas, aerosol or paste. In combination with a matrix material continuous or discontinuous fibres may also be deposited to form a composite material. In a preferred embodiment the media may comprise a polymer pellets or filament. Typically such a feedstock may be heated by an energy source to a temperature such that the material can be fed, directed, extruded, jetted or otherwise deposited in a controllable manner. Alternatively a fluid material may be supplied to the processing head from a media reservoir which may be provided in the machine. The material may be heated by an energy source till all the material in the reservoir is fluid and can be extruded in a controllable manner. In some embodiments the material may also comprise conductive, semi-conductive, capacitive, piezoelectric and dielectric material such that electric circuits can be laid down during formation of the work piece.

In another preferred embodiment the media may comprise metals which may be provided in the form of powders or wires. Such metals may be used in forming the body of the work piece or may be applied to a part of the work piece in order to lay down electronic circuits.

A particular advantage of the machine is that a wide variety of heads may be provided and these are able to deposit material so as to produce work pieces complete with embedded electronic, biological and other functional subsystems.

It is envisaged that the machine may be used for making prototypes, end use products and entire products.

In a preferred embodiment the integrated docking system is arranged to be able to supply material and energy to the processing head when required. Preferably the laser energy required for processing is delivered parallel to the z axis, but from a point removed from the close proximity to the working area. It will be appreciated that advantages arise as the laser beam path can be direct and so the laser power that can be delivered is reduced less because of the few reflectors and optics than with side docking delivery of laser power which necessitates the use of mirrors in the beam path.

In one preferred embodiment the docking may be provided on a top face of the processing head and the integral docking in the carriage is arranged to align and to mate with a manifold on the carriage with the processing head.

In other embodiments a manifold and docking means may be provided in a collar of the carriage. The carriage may comprise a spindle arranged to be moveable in the z direction and the docking manifold may be provided on a collar of the spindle. Provision of an integral energy source in the machine has a number of advantages. In some embodiments the energy source may be by means of a beam targeted on the work piece. Control means can be provided to control the applied beam of energy and the source may be selected from lasers, such as infra-red lasers, visible light lasers and UV lasers. Pulse durations may be controlled to vary from an attosecond (as) up to femtosecond (fm) and so on up to continuous wave (CW) durations. The energy source selected may be chosen depending on the process being carried out—whether removal, addition or alteration of the material. The energy source and pulse duration may also be selected to optimise absorbance of the energy by the material to be processed. A beam switch may also be used for changing between different laser beams sources.

In some embodiments the energy source may be supplied to the work piece or to the processing head, particularly a processing head, using a fibre optic cable arranged to be carried by the carriage to the processing head. It will be appreciated that in some cases a hollow core may be required due to the energy density.

As has already been discussed the machine has a clean side and a dirty side and the work piece can be located in a chamber. Preferably the processing heads or deposition heads are maintained in a clean condition. It will be understood that contamination of the work piece in the course of deposition or processing of the work piece can lead to poor quality finishes or imperfections in the material. Accordingly it is important to maintain the processing heads used on the clean side without contamination or to minimise contamination that can occur.

Preferably the machine and particularly the processing heads are cooled using a cryogenic cooling system. In a particularly preferred embodiment an organic coolant is used which evaporates, vaporizes, flatulises or otherwise combusts to form products with a very low ash content and which leave no residue behind. It will be appreciated that other coolants may be used such as liquid nitrogen.

In some embodiments the coolant may be supplied to the chamber or the coolant may be supplied to the work piece or to the processing head.

The clean side can be maintained by providing seals between the chamber and the clean tool changer. Any processing heads used for deposition or processing may be stored in the second tool changer and the second tool chamber may be suitably sealed. Processing heads used for milling do not need to be kept in a clean environment and are stored in the first tool changer when not in use. As the first tool changer is on the "dirty" side the first tool changer does not need to be sealed from the chamber or the work piece.

In a particularly preferred embodiment the machine is provided with duplicated supports and carriages arranged to move in the z direction. In some cases the supports and carriages are the same. In other cases it may be preferable to provide specialised docking and manifolds on each of the supports and respective carriages. As discussed above one of the supports and carriages is used exclusively for clean processing and the other support and carriage is used exclusively for "dirty" processes.

Preferably docking of the heads on the carriage and support is arranged to maintain a clean environment. Preferably the optics of laser processing heads are not exposed to the air and are maintained in a clean environment at all times. In some embodiments an automated cover system is provided whereby actuation of a cover on the dock opens a corresponding door on a selected processing head. Once docking of the head on the carriage has been completed the system is sealed. Automation of the docking process allows the process to occur with out visual inspection being required. It will be appreciated therefore that a machine equipped with an automated docking and not requiring visual inspection may use higher power lasers since it is no longer necessary to provide laser safe windows for inspection.

In some embodiments the environment may be maintained as a clean environment by the use of air knives and air purging. This may be particularly desirable around the areas used for head changing and for docking of the head with the carriage.

It is desirable that the second processing heads are maintained in a clean environment during storage in the second tool changer. Preferably a separate storage area is provided for processing heads. In some preferred embodiments the processing heads may be reversed into the tool changer such that a face of the processing head is sealed against a surface of the tool changer pocket.

Another important area is control of powder used in additive manufacturing of the work piece. Typically powder is applied to the surface of the work piece. Commonly it is a problem that some of the powder will not be retained on the work pieces. In some cases there will be overspray.

Desirably the machine comprises a waste extractor. This may be used to remove swarf from the bottom of the working area where it accumulates with the cutting fluid. Additionally, fumes and humidity may be removed from the working area using appropriate filtration, extraction and dehumidification. Such an air filtration/de-humidifying system prevents airborne contaminants and humidity from affecting the cleanliness of the working area.

In a preferred embodiment there is integrated capture of the overspray powder. In some cases a tray may be provided in the machine that can be slid into the chamber to capture overspray powder. Preferably material captured by the tray can be collected and may be re-used directly or may be reconditioned and re-used. Some material may escape the powder collection tray. Such material is typically removed from the chamber with the coolant and may be filtered from the coolant and re-used.

An important aspect of the machine is the provision of integral monitoring of the work piece and the processing head or heads.

In known systems in which a work piece is milled or cut or processed by removal of material the work piece is typically considered to be of good quality. However in additive manufacturing it has been realised that it is important for quality of the work piece to ensure that the processing has been carried out to a high standard to ensure that any additive manufacturing good quality. It is important therefore to monitor the processes and the work piece to ensure that any imperfections are detected.

Preferably at least one of the following monitoring methods may be provided on the machine. The melt pool in processing or additive manufacture may be monitored. A thermal history of the work piece may be monitored and recorded using thermal cameras. Oxygen sensors may be provided in the chamber. Spectrocscopy may be used to analyse parts of the work piece in the processing. Such monitoring may be provided on the carriage or may be separately provided in the chamber of the machine.

Additionally or alternatively the processing may be monitored by the use of accelerometers in the processing head. Calibration routines may be carried out using detectors located in the chamber. Such routines may be arranged to monitor the or each processing head and/or the work-piece. Desirably wireless communication is enabled between the processing heads and a controller in the machine. Communication with a remote controller or output may also be provided. Such communication may use IR or radio data transfer. Additionally to communication of processing data using MT Connect may be utilized or other established wireless protocols.

In some embodiments a focal length of any optical elements may be monitored and data output.

In one embodiment sensors and circuitry may be embedded into a work piece as it is being made to form a monitoring device that can monitor the condition and health of a part in use. Preferably such sensors and monitoring devices to be printed into and onto work pieces may be arranged to function and give feedback to users prior to completion of said part. It is envisaged that the monitoring devices could continue to function throughout the service life of the part. An example of such a monitoring device would be a strain monitoring circuit, which could detect when a device had been loaded beyond a safe condition.

In some preferred embodiments data from the machine and from processing heads may be output to remote monitoring means. Preferably a performance of the machine and the delivery heads and data from the chamber and the work piece is monitored and reported in real time. In some embodiments an analysis may be carried out in real time. Preferably a statistical analysis may be carried out to predict failure of work pieces. In some embodiments the analysis may be applied to the processing heads to identify potential failure of the processing heads. In all cases it is preferable for the detections to form a closed loop feedback system to ensure quality production of parts and if needed enable remedial re-work of areas of the parts that do not meet acceptable quality standards in situ to avoid scrapping the part.

According to an aspect of the invention there is provided a machine in accordance with an aspect of the invention in which at least one carriage is provided with an integrated docking system.

Preferably the docking system is arranged such that docking between the carriage and the head is at a top face of the processing head.

Desirably integral docking with the carriage aligns and mates a manifold on the carriage with a cooperating manifold in the processing head. In some preferred embodiments the manifold is to orientated perpendicular to the delivery head loading axis. This may eliminate or reduce the need for the supply docking manifold to be moved since the processing head docking action also accomplished docking of the manifolds. It has been found that this action is particularly suitable for energy sources that do not require a line of sight but it can also be used with lasers and with other energy sources.

In a preferred embodiment the connection between the carriage and the processing head is arranged to be sealable so as to preferably exclude contaminants.

In some embodiments the processing head manifold is arranged to be fixed. However in some preferred embodiments the manifold is arranged to move outwardly from the processing head to a docking position. This has been found to be particularly advantageous as the processing head occupies less space in the tool changer. In addition in the storage position a seal can be provided over the manifold. This is particularly advantageous for processing heads that are used on the clean side and for which it is desirable to maintain all of the elements in as clean a state as possible. Such a seal may be provided by a sliding door.

A deposition head comprising an electrode providing energy to a work piece and a media feed wherein the head comprises means for generating integral electromagnetic field arranged to bend an arc between the electrode and the work piece.

The integration of additive manufacturing technology into a CNC machine has prompted new approaches to beam delivery, to maximize the utility of the combination. This also introduces a new approach to laser beam delivery for CNC machines, including the ability to switch between different sets of optics and even deposition technologies automatically.

According to another aspect of the invention there is provided a machine arranged to carry out removal and addition of material on a work piece located in a work station having at least one device arranged to process the work piece, the device being arranged to be moveable in at least two axes and wherein the work piece is processed in a sealable chamber.

According to another aspect of the invention there is provided a machine arranged to carry out removal and deposition of material on work piece located in a work station, the machine having at least one device arranged to process the work piece, the device being arranged to be moveable in at least two axes and having a clean side and a dirty side and wherein deposition of material on the work piece or processing of the work piece is carried out in a clean environment.

According to yet another aspect of the invention there is provided a method of working on a work piece comprising placing the work piece in a chamber of a machine according to an aspect of the invention and processing the work piece by removal of material, cleaning the chamber by removing waste from the chamber and the work piece, processing the work piece in a clean environment in the chamber and removing the work piece from the chamber.

In some embodiments automated means may be provided to place a work piece on the work station. Preferably the automated means may comprise pick and place grippers. Such grippers may move the work piece from a first position to a second position on the work platform or may move the work piece into and out of the working area. In a preferred embodiment the grippers select and place objects including electrical objects for embedding into parts as they are being made. The working area may be the chamber or may be the work platform.

AM and CNC can be combined such that an article can be fabricated or repaired using AM and finished by having the surface processed using material removal, such as CNC material removal and this process is illustrated with reference to FIG. 1. It is known to use a machine having a number of heads permanently connected to the tool and selectable to work on a work piece. Such arrangements increase the bulk and volume occupied by a machining head which restricts operation of the machining head. It is also known to It is also known to move a work piece from one work station to another which each work station carrying out a specific operation including additive steps and post deposition treatment and cutting.

As briefly referred to above, the machine is particularly adapted to the maximize the advantage of the heads and methods of using the heads but it will be appreciated that the heads may be retrofitted to existing CNC machines to enable the use of existing CNC machines for additive manufacturing and post deposition treatment and cutting. Accordingly there are further aspects of the invention disclosed herein which relate to the features of the heads and the methods of using the heads and carrying out methods of manufacture.

According to an aspect of the invention there is provided a method of creating an article comprising at least one of the following steps:
i) using a first processing head, which may have a first deposition characteristic, to lay down material having a first set of properties;
ii) changing the first processing head for a second machine head, which may have a second deposition characteristic different from the first;
iii) laying further material down having a second set of properties.

According to another aspect of the invention there is provided a method of creating an article comprising at least one of the following steps:

i) using a machine tool having a work station, a first processing head connectable to the machine tool; a tool changer and a storage location arranged to store a number of further processing heads;

ii) using the first processing head, which may have a first deposition characteristic, to lay down material having a first set of properties;

ii) changing the first processing head for a second processing head, which may have a second deposition characteristic different from the first; and iii) laying down further material having a second set of properties.

Preferably the storage location is a part of the machine but is remote from the work station. Preferably any processing heads not being used are stored in the remote storage location and are not connected to the machine tool when not in use.

Embodiments providing the features of the above aspect are advantageous in that they allow the type of process that is being performed on the article that is being fabricated (ie a work-piece) to be performed at a single station without the need to move that work-piece between stations. Thus, this aspect may be thought of as providing a single piece or pseudo single piece flow for the fabrication process. It will be appreciated that a suitable processing head is selected and is moved to the work-piece.

A machine tool holding the processing head may, in at least some embodiments, automatically change the processing head from the first head to the second head thereby providing a method which can run with little or no operator interaction.

Preferably the method comprises use of a machine tool having a having a work station at which the article is created, a first processing head connectable to the machine tool; a tool changer and a storage location arranged to store a number of further processing heads. The tool changer may be arranged to remove the first processing head from the machine tool, place the first processing head in a storage location; remove a second processing head from the storage location and connect the second processing head to the machine tool.

Conveniently, the second deposition characteristic varies one or more of the following parameters when compared to the first deposition characteristic:

Angle of deposition (relative to the build surface); type of material; mixture of materials being deposited; deposition rate; bead size; cross-sectional shape of deposition; energy input; nano/micro characteristic of material (which includes hardness, ductility, chemical resistance, strength, wear resistance, electrical and thermal conductivity, dielectric strength, or any other material property); colour and transparency of material; texture of the surface finish.

In some embodiments, the second deposition characteristic is arranged to improve the fidelity of the article being created to the desired article thereby removing, or at least reducing, the need for surface finishing of the article. Embodiments may improve the fidelity of at least one of an internal and an external surface of the article.

Some embodiments may be arranged to deposit a sacrificial material with at least one of the first and second processing heads.

At least some embodiments are arranged to create the article in stages such that at least one of the first and second processing heads are used a plurality of times.

At least some of the embodiments use a third processing head which may be used to remove material from the article. The third processing head may be a milling head, or other machine tool.

In at least some of the embodiments the method may include the use of a processing head arranged to treat the surface of the work piece after at least a first layer of material has been deposited. The surface of a second or further layer may also be treated.

Typically a processing head may be connected to a spindle on the machine tool. It will be understood that the spindle is considered to be part of the machine tool.

In some embodiments the machine tool may comprise a supply unit arranged to supply or to be able to supply a power source to the or each processing head. The processing head may comprise a docking manifold arranged connect to the supply unit to supply power to the processing head. The docking manifold may be arranged to be alongside or adjacent to the spindle. In some embodiments the docking manifold may be arranged to connect along an axis transverse to the spindle. In other embodiments the docking manifold may be arranged to connect along an axis parallel to the spindle. In other arrangements the manifold may be rotated into position. In other arrangements the manifold may be incorporated into the spindle column, spindle housing or one of the axes convenient to offer access to the spindle such as the Z-axis for many machine configurations. For example ports in the manifold may be arranged in a pattern around the collar of the spindle.

The power source may be laser energy. Each processing head may be configured to achieve a unique spatial mode and power distribution from the head. The mode may be achieved by the use of optical train components such as apertures, fixed or variable diffractive or reflective optic and ancillary guide mechanisms as are known in the art.

Preferably the docking manifold is arranged to supply processing media to the processing head in addition to or instead of supplying power to the processing head. The processing media may be one or more of a metal, a plastic, polymer or ceramic material in a powder or a filament form, cooling or processing fluids, gases and the like including mixtures thereof.

According to another aspect of the invention there is provided a method of creating an article comprising at least one of the following steps:

i) using a first processing head, having a first deposition characteristic, to lay down material having a first set of properties;

ii) changing the first processing head for a second processing head wherein the second processing head is arranged to analyse at least one of the article being created and a function of a processing head.

Preferably the method further comprises using the information from the analysis to select a further treatment or processing step to be carried out.

Preferably the method comprises use of a machine tool having a work station at which the article is created, a first processing head connectable to the machine tool; a tool changer and a storage location (or simply a storage location for the tools which is reachable with the spindle as is known in the art for changing conventional rotary cutting tools) arranged to store a number of further processing heads. The tool changer may be arranged to remove the first processing head from the machine tool, place the first processing head in a storage location; remove a second processing head from the storage location and connect the second processing head to the machine tool.

Conveniently, the second processing head is any one or more of the following: an image recording apparatus; lighting; touch probes; 3D surface and volumetric scanners; photogrammetry systems, sensors (such as oxygen sensors; thermal sensors; thermal cameras) eddy current generators, ultrasound transducers (for air, gel, and liquid coupled), electromagnetic wave generators, induction heating coils, electromagnet(s), a magnification device, incremental sheet forming tools, heat gun, vacuum, induction heater, galvanometer, oscilloscopes, digital mirror devices, structured light scanners, grinders, abrasives, right angle variations of heads, microscopes, confocal or variable microscopes, electromagnetic detectors including gamma and X-ray, spectrographs, etc.

Preferably the docking manifold is arranged to supply power from the supply unit to the second processing head and to transfer data to and from the second processing head.

Advantageously there is provided a controller arranged to control the machine tool and the tool changer. Preferably the controller has a data storage component and parameters of the processing heads are stored in the data storage component. Preferably the controller is arranged to control the first processing head to deposit material and is then arranged to select a second processing head dependent on the material deposited and the work piece to be created. The controller may use data from the analysis to select a further processing head to be utilised.

The data from the second processing head may be used for quality control of the treatment of the work-piece. The data may also or alternatively be used to ensure that the workpiece meets a desired quality standard. Data from the second processing head may additionally provide information on the function of a processing head. Such data may allow the calibration of the processing head to be evaluated or to establish that the processing head may need to be replaced or repaired.

According to another aspect of the invention there is provided a machine-tool arranged to provide the method of at least one of the first aspect of the invention.

The machine tool may be adapted to provide a method of the invention. The machine tool may be retrofitted with processing heads and a controller and arranged to carry out one or more of the disclosed methods.

According to another aspect of the invention there is provided a machine readable medium containing instructions which when read by a computer cause that computer to perform the method of the at least one of the aspects of the invention.

According to another aspect of the invention there is provided a method of inspecting an article being fabricated, the method comprising at least one of the following steps:
  i) ejecting a fluid from a first processing head onto the article being inspected;
  ii) coupling a second processing head via the fluid to the article being inspected; and
  iii) transmitting a signal via the fluid in order to inspect the article.

In one embodiment, the first and second processing heads are the same head and the method therefore provides an efficient means for inspecting an article.

The fluid may be a cooling fluid which may be a through spindle cooling fluid thereby providing a method which allows a processing head to be fitted to an existing machine tool. In such embodiments, the fluid may be a machine tool cooling fluid arranged to be used during a material removal process.

In alternative, or additional, embodiments, the fluid may be a gel or the like. Such a fluid may be thought of as being a sacrificial fluid as it will latterly be removed from the article being inspected.

In other embodiments, the first and second processing heads are different and in which the first processing head is arranged to deposit a sacrificial material.

According to another aspect of the invention there is provided a machine tool and/or a processing head arranged to perform the method of the another aspect of the invention.

According to another aspect of the invention there is provided a machine readable medium containing instructions which when read by a computer cause that computer to perform the method of the another aspect of the invention.

The machine readable medium referred to in any of the above aspects of the invention may be any of the following: a CDROM; a DVD ROM/RAM (including -R/-RW or +R/+RW); a hard drive; a memory (including a USB drive; an SD card; a compact flash card or the like); a transmitted signal (including an Internet download, ftp file transfer of the like); a wire; etc.

According to another aspect of the invention there is provided a method of processing a work piece comprising:
  i) using a first processing head, which may have a first deposition characteristic to lay down material having a first set of properties;
  ii) processing the article being created by at least one of laser ablation, drilling, marking, cladding, inspection, 3D scanning, heat treatment, hammering, scarifying, shot blasting, peening or micro-peening, needle peening, or rolling, the method including a plurality of processing steps carried out on the work piece.

In a preferred method a series of processes are carried out by a further processing head or heads. Preferably each processing head is arranged to be optimised for a particular process.

The method includes a plurality of processing steps carried out on the work piece. The method may include two, three, four, five or more processing steps.

Preferably at least one of the process steps comprises inspection and or analysis of the work-piece. Desirably at least one of the further processing steps is selected using data from the analysis of the work piece.

According to another aspect of the invention there is provided a processing head arranged to carry out two processing steps simultaneously.

In one embodiment heating and pressure treatment are carried out by the same head. In other embodiments alternative processes or treatments may be combined. An exemplary list of processes which may be combined is set out below. It is emphasized that the list is exemplary and not exhaustive.

Induction heating and laser metal deposition such as cladding or welding, etc;
  induction heating and peening;
  induction heating and laser processing such as heat treatment, etc;
  laser heating and peening;
  laser heating and rolling;
  laser heating and chiseling (to remove material);
  laser heating and pressure pins;
  laser material deposition and inductive stand-off measurement
  laser polishing (or other processing) and a camera to assess the effectiveness of the process
  shot or grit blasting to clean/roughen the surface just ahead of laser processing shot peening to impart compressive stresses into the former layer just after laser deposition deposition of a degreasing agent, followed by an air blow off to prepare the surface deposition nozzle for a mineral based flux just ahead of an arc based metal deposition head (where the flux creates a slag to protect the cooling weld pool from oxidation)

air blow off plus a laser metal deposition head use of a camera such as for registration on fiducial marks with inkjet nozzles;

use of one or more cameras (visible, HDR, IR, etc.) and a process to inspect the process;

laser metal deposition and a detection means to identify surface and/or sub-surface defects, such as by eddy current inspection;

eddy current inspection and 3D scanning (for surface form);

laser metal deposition and 3D scanning;

laser metal deposition and multiple cameras (photogrammetry);

inkjet head and a camera;

deposition of reinforcing fiber with a cutting device to cut fiber when needed milling and camera (for measurement)

microscope(s) (confocal, stereo, etc.) and a lighting means.

It will be further appreciated that the processing head may be arranged to carry out other combinations of processes than those set out above. In some embodiments the processing head may be arranged to carry out a plurality of processes.

In some embodiments the work piece may be inspected or analysed. In some embodiments the processing head may also be arranged to be analysed. Such analysis may provide date relating to the condition of the processing head.

In a preferred embodiment heating and pressure treatment are carried out simultaneously. Preferably the pressure treatment is intermittent. In a preferred embodiment the pressure treatment is peening.

In some embodiments the processing head may be arranged to be optimised to carry out two processes simultaneously such as laser cladding and hot rolling. In other embodiments the processing head is arranged to carry out laser deposition (or other forms of welding, cold spray, directed energy deposition, etc.) and peening simultaneously. Preferably a portion of the head having peening pins is arranged to follow the deposition of material on the work pieces such that the deposited material is processed while it is hot. In other embodiments a laser deposition head may incorporate a portion having rollers.

Preferably the docking manifold is arranged to connect the processing head to the supply unit and to supply power and media to the processing head.

In the embodiment in which laser cladding and hot rolling is carried out simultaneously the docking manifold is preferably arranged to connect the processing head to the supply unit to supply power for the laser cladding and cooling fluid to cool the rollers in the hot rolling operation. The docking manifold may also be arranged to supply media to the processing head.

In a particularly preferred embodiment the method comprises surface treatment of the work piece by peening. It is desirable to apply pressure to a localised area on a layer or part of a layer of a work piece to reduce stress in the layer. In some cases when a layer of a material is thermally deposited rapid cooling can cause it to be under a tensile stress. It is desirable to reduce or eliminate the tensile stress by the application of pressure to some or all of the layer. This can be referred to as peening or micro peening. It can be undertaken incrementally so as to achieve part, total or repeated coverage of the areas with residual stress.

In some embodiments the peening may be achieved by indexing the processing head to follow a line of deposition. In a preferred embodiment the head may be arranged to activate one or more peening pins to add pressure in the wake of an area treated by the processing head. The processing may be by means such as a laser. Desirably a plurality of pins can be activated. In a preferred embodiment activation of the pins is arranged to be countercyclical to a laser pulsing frequency. In other embodiments the energy source may be an arc, an electron beam, microwaves, induction heaters or other similar energy sources. These stress reduction techniques can be enhanced by choosing build strategies which distribute the stresses in a balanced way, such as using build patterns (where the desired end geometry is amenable to it) which are thin walled and symmetrical. Parts may also be built imitating a seed where the layers are not planar, but are substantially spherical - essentially beginning around a small core and layers grow outward (in a similar way to how a pearl grows layer by spherical layer).

In some embodiments a processing head may be provided in which a media is supplied to a work piece and an energy source applies energy to the work piece. In a preferred embodiment the processing head may be arranged to control a direction in which the energy is directed to the work piece.

In a preferred embodiment the energy source and the media feed may be connected to the processing head by means of a receiving manifold on the processing head. The receiving manifold may be arranged to connect to a supply manifold on a carriage carrying the processing head. The media feed is preferably substantially parallel to the electrode. Such an arrangement facilitates automation.

Desirably the energy source is arranged to create a weld pool. Preferably the energy source is an arc between the processing head and the work pieces. Alternatively, an electron beam passing through a plasma "window" may also be useable. Preferably the media feeds directly into the weld pool. It is desirable that the processing head comprises means arranged to control the direction of the energy towards the work piece and in a preferred embodiment the processing head comprises means of generating an electromagnetic field. Desirably the electromagnetic field may be controlled so that a position of the weld pool relative to the media feed may be controlled. To minimize the variability in the deposited material characteristics during omnidirectional material deposition it is desirable to allow coaxial feed of the material on spindle centerline and position the weld pool to effectively be on the same coaxial line.

In some embodiments automated means may be provided to place a work piece on the work station. Preferably the automated means may comprise pick and place grippers. Such grippers may move the work piece from a first position to a second position on the work platform or may move the work piece into and out of the working area. In a preferred embodiment the grippers select and place objects including electrical objects for embedding into parts as they are being made. In some case a magazine of components may be integrated into the pick and place heads as illustrated in FIGS. 40 and 41. The working area may be the chamber or may be the work platform.

According to another aspect of the invention there is provided a machine tool arranged to carry out the steps of processing a work piece comprising:
i) using a first processing head, which may have a first deposition characteristic to lay down material having a first set of properties;
ii) processing the article being created by pressure treatment.

According to a further aspect of the invention there is provided a processing head arranged to apply pressure to at least a portion of a work piece created by additive manufacturing.

According to another aspect of the invention there is provided a method of creating an article comprising at least one of the following steps of processing a work piece comprising:
i) using a first processing head, which may have a first deposition characteristic to lay down material having a first set of properties;
ii) processing the article being created by pressure treatment.

In some preferred embodiments the pressure treatment is intermittent. Preferably the pressure treatment is by means of one or more impacts on the surface of the deposited material. The movement may be mechanical or may be ultrasonic. Mechanical movement may be generated by the machine tool or by the processing head. The movement may be generated by actuation of pins in the head. The actuation of the pins may be simultaneous or may be sequential. Preferably coolant fluid is supplied to the processing head to keep the pins cool.

Preferably the head may comprise one or more rollers, at least one array of rollers, one or more notched rollers. In other embodiments the head may comprise a pin, chisel or hammer or a plurality of pins, chisels, or hammers. A power supply is preferably connected to the processing head. In some embodiments micro peening is carried out by the use of mechanical movement. The movement may be generated in the machine tool. Preferably the mechanical movement is generated in the processing head. Alternatively the movement may be ultrasonically generated. In a particularly preferred embodiment the processing head comprises an array of pins. The configuration of the array may be selected in view of the geometry of the work piece being stress relieved. A sequence of processing heads may be selected to fit a particular geometry. This may be done by the operator based on their experience or preferably by an algorithm in CAM software.

The controller may select a processing head to analyse the work piece and use data from the analysis to select a further processing head.

According to another aspect of the invention there is provided a processing head having a receiving manifold, the receiving manifold having an openable closure sealing an opening and an actuator arranged to move the closure between an open and a closed positon.

Preferably the receiving manifold is arranged to open the closure when the receiving manifold is connected to a supply manifold. Desirably the arrangement is such that an interior of the processing head is not exposed to the general environment.

In a preferred embodiment an interior of the processing head may contain a laser path and the laser path is not exposed to environmental contamination in the docking/undocking process. Once the processing head has docked and the head is securely connected to the supply manifold the power supply to the laser path can be connected. The power supply may be a laser beam.

Preferably the supply manifold is also provided with a second openable closure and a second actuator is arranged to move the second closure between an open and a closed position. The first and second closures may be arranged to be openable together to allow connection from the supply manifold to the processing head.

As described above the processing head may be stored and used in a clean environment and the protection of the interior and the exterior of the head provided significant advantages over existing heads and environments of use of the heads. it will be appreciated that the provision of a clean connection between the processing head and the supply manifold provides significant advantages when the heads are used with existing CNC machines.

In some embodiments the receiving manifold may be provided in the processing head and may be arranged to dock with a supply manifold in a machine according to an aspect of the invention. Preferably the receiving manifold is arranged to connect to a carriage on which the processing head is engaged in the machine described. In a conventional machine the receiving manifold maybe arranged to connect to a supply manifold provided on the machine. The receiving manifold may have an open position in which a connection with the supply manifold can be made and a closed positon in which connections in the receiving manifold are protected from contamination.

The opening may be provided on a side of the processing head and arranged to connect with a corresponding side mounted opening on the supply manifold. Alternatively as described above, particularly but not exclusively in connection with the machine the receiving manifold may be provided on an upper face of the processing head. In some embodiments the manifold may be moveable from a retracted positon to a connection position. A retractable manifold may in some preferred cases be provided on a side of the processing head.

The skilled person will appreciate that a feature described in relation to any one aspect and/or embodiment of the invention may be used, mutatis mutandis, to any other aspect/embodiment of the invention.

The invention will now be further described by way of example only with reference to the accompanying drawings in which FIG. 1 is a partial cross section and perspective view of a machine in accordance with the invention;

Figure 10A:
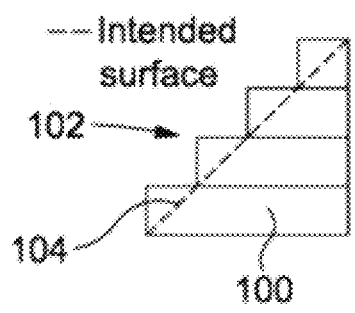
Figure 11A:
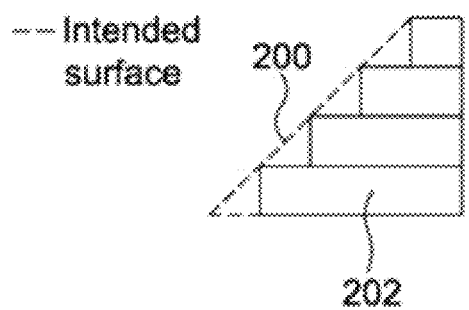
Figure 12:
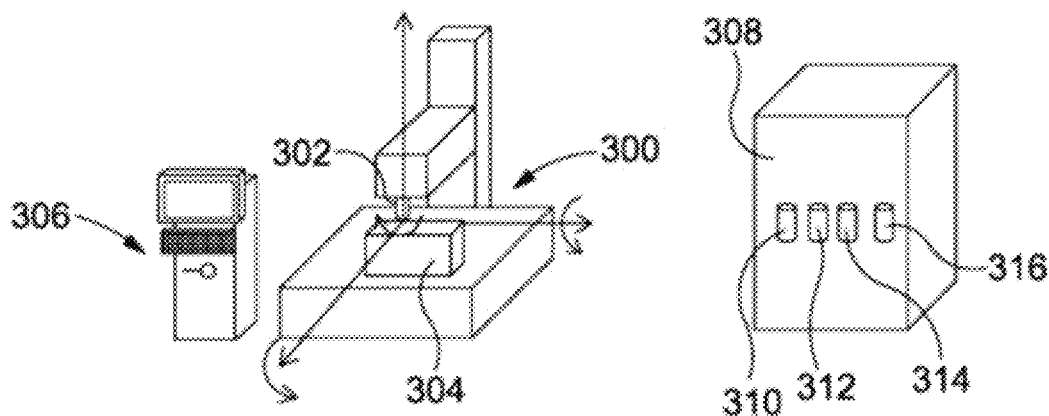
Figure 13:
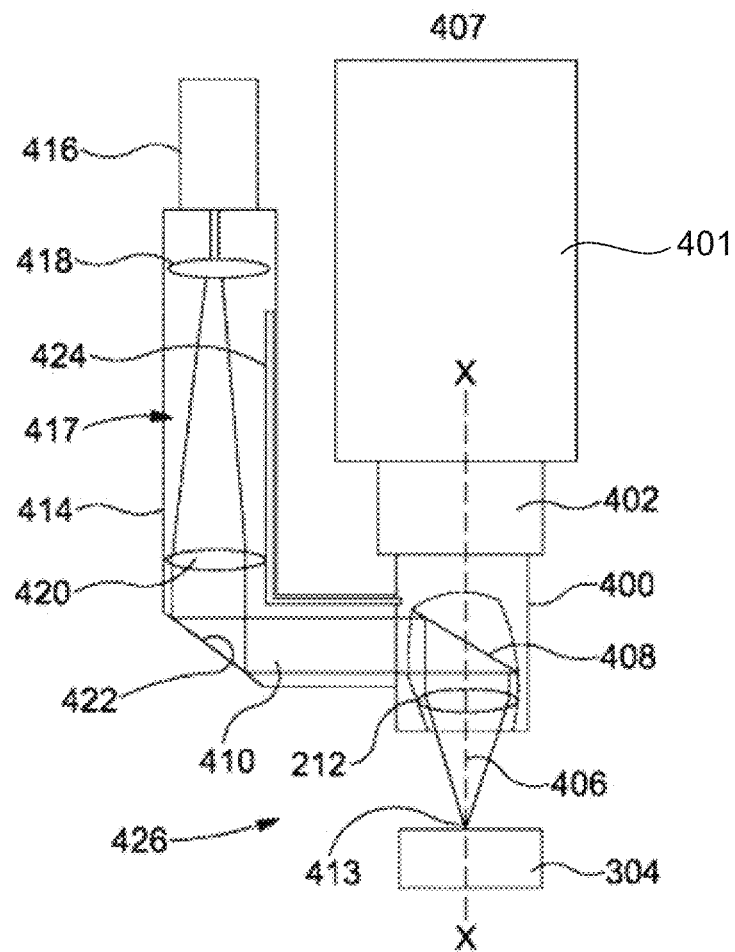
Figure 14:
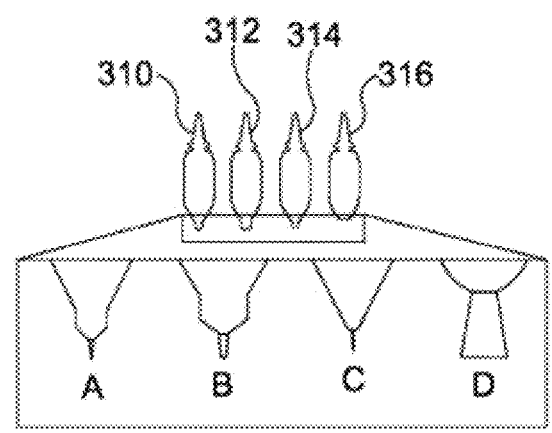
Figure 15:
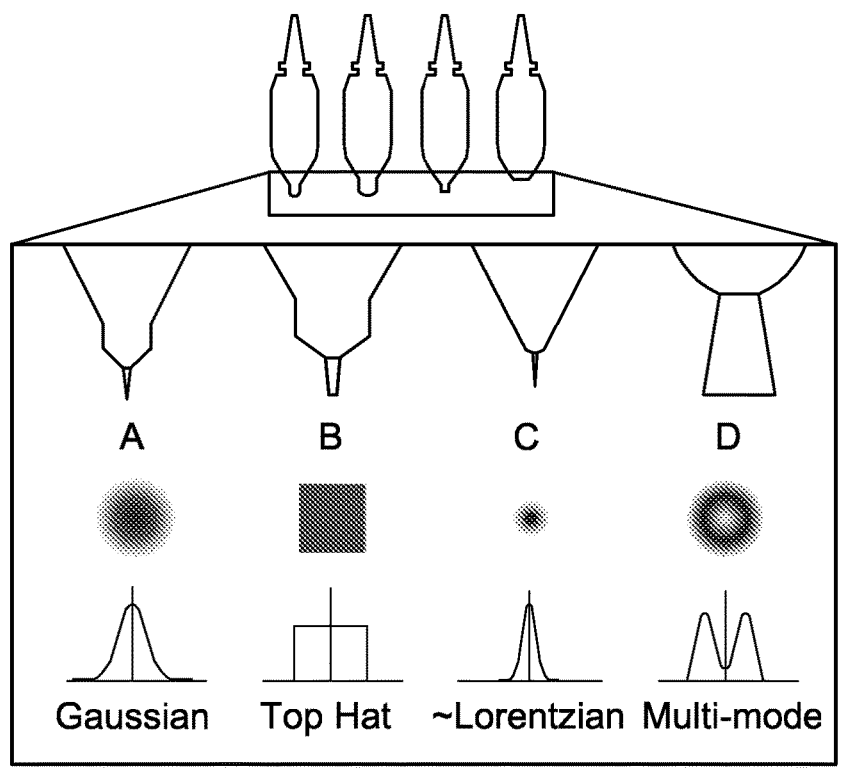
Figure 16:
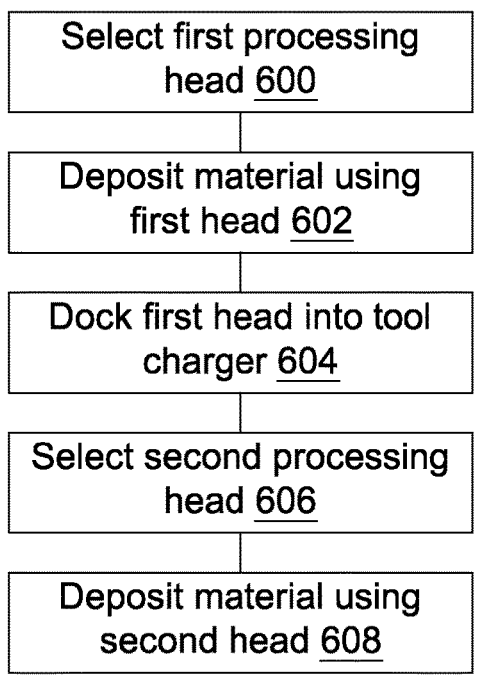
Figure 17A:
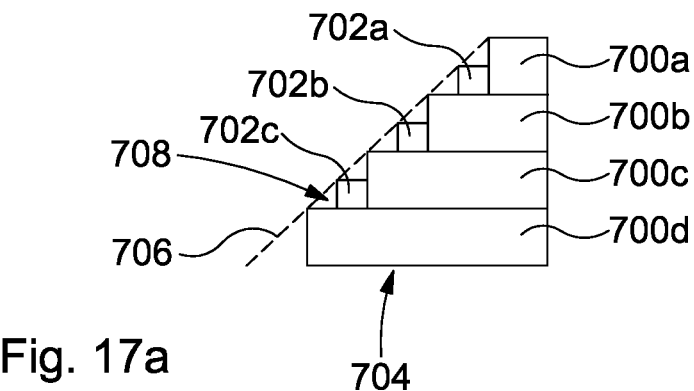
Figure 17B:
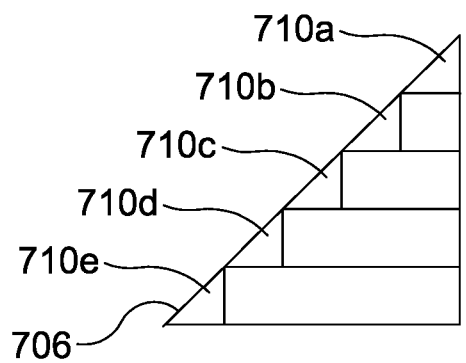
Figure 17C:
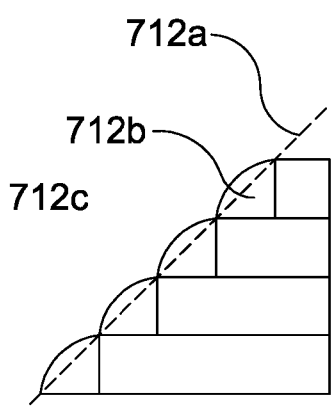
Figure 18:
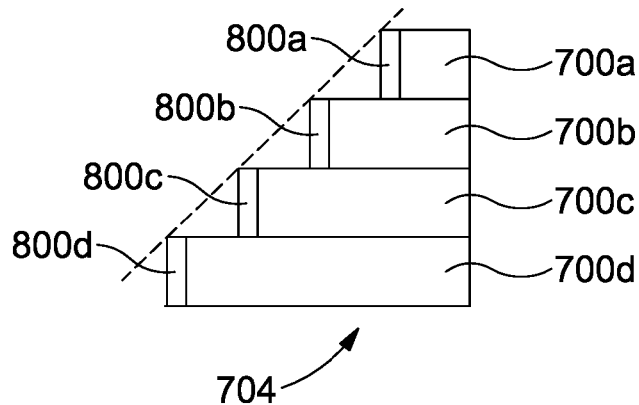
Figure 20A:
Figure 20B:
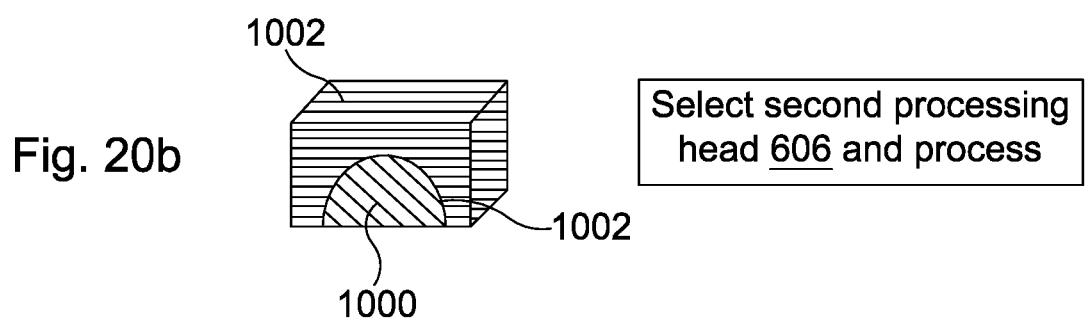
Figure 21:
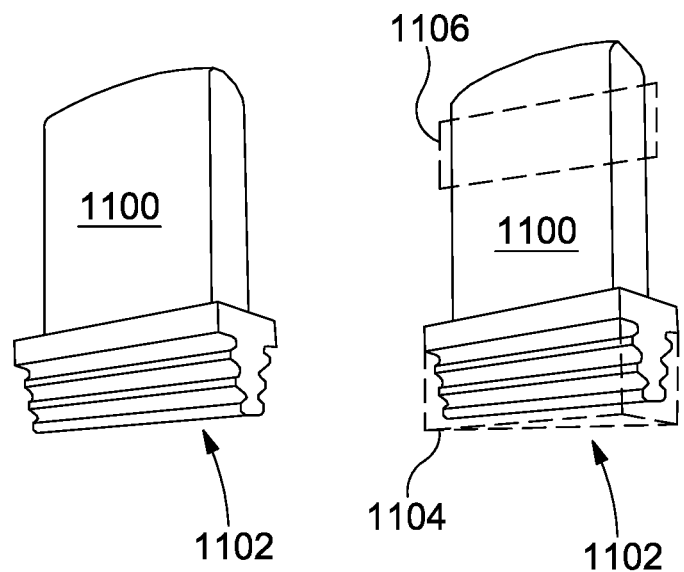
Figure 22:
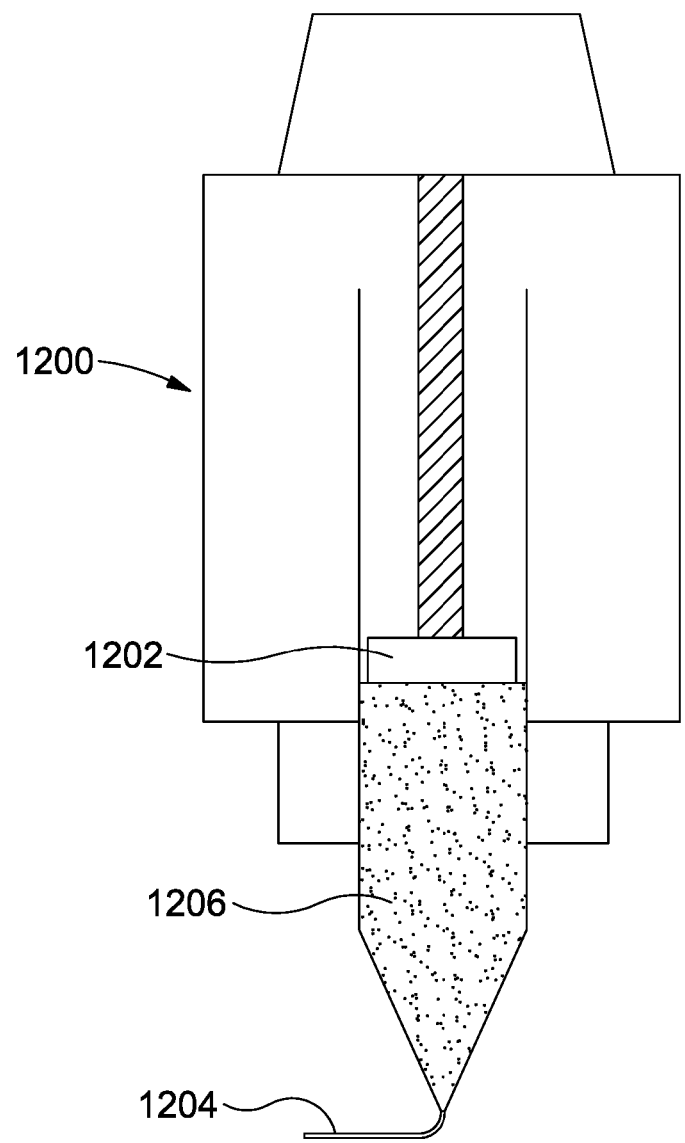
Figure 23:
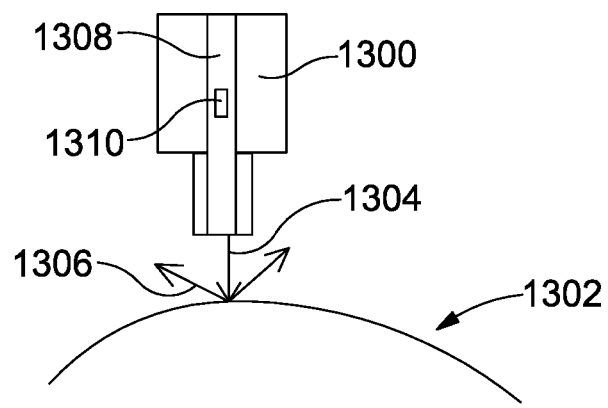
Figure 24:
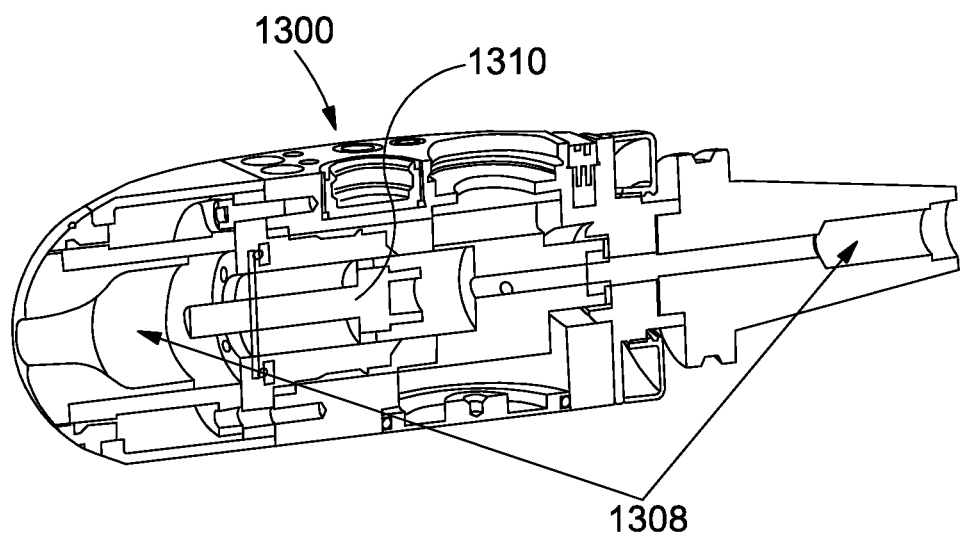
Figure 25A:
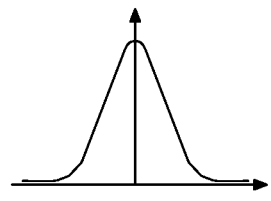
Figure 25B:
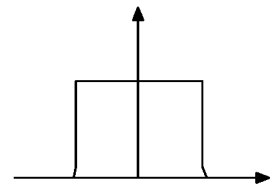
Figure 25C:
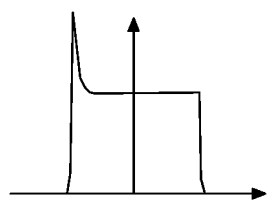
Figure 25D:
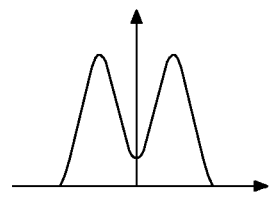
Figure 25E:
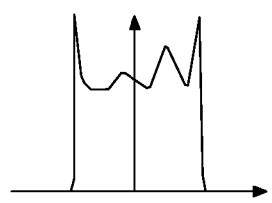
Figure 26A:
Figure 26B:
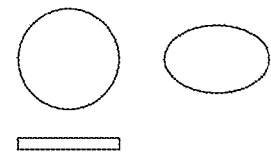
Figure 26B:
Figure 26B:
Figure 26C:
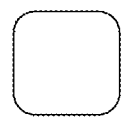
Figure 26C:
Figure 26D:
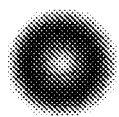
Figure 26E:
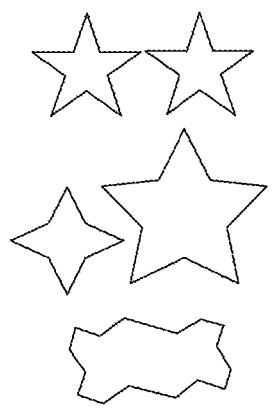
Figure 27:
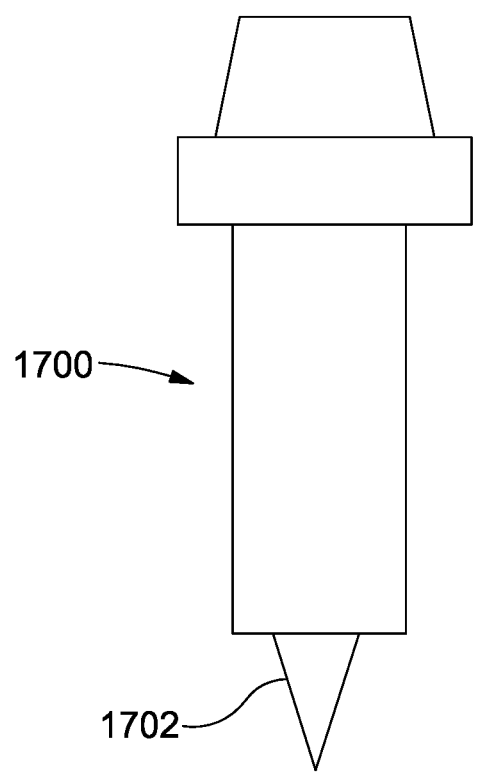
Figure 28:
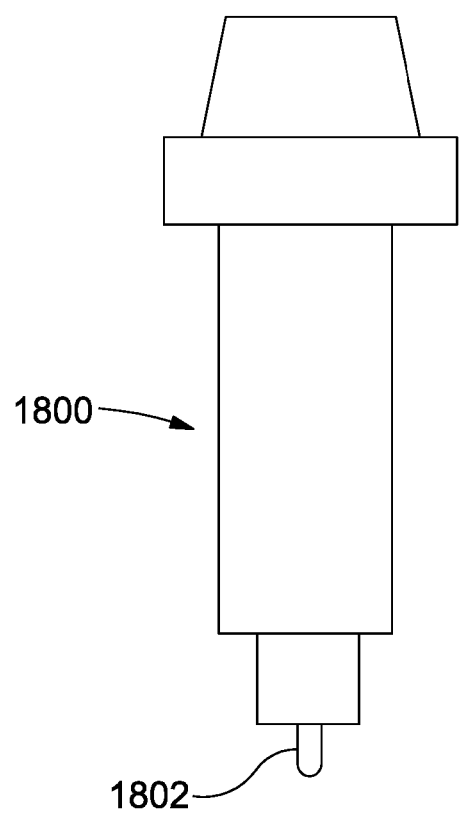
Figure 33:
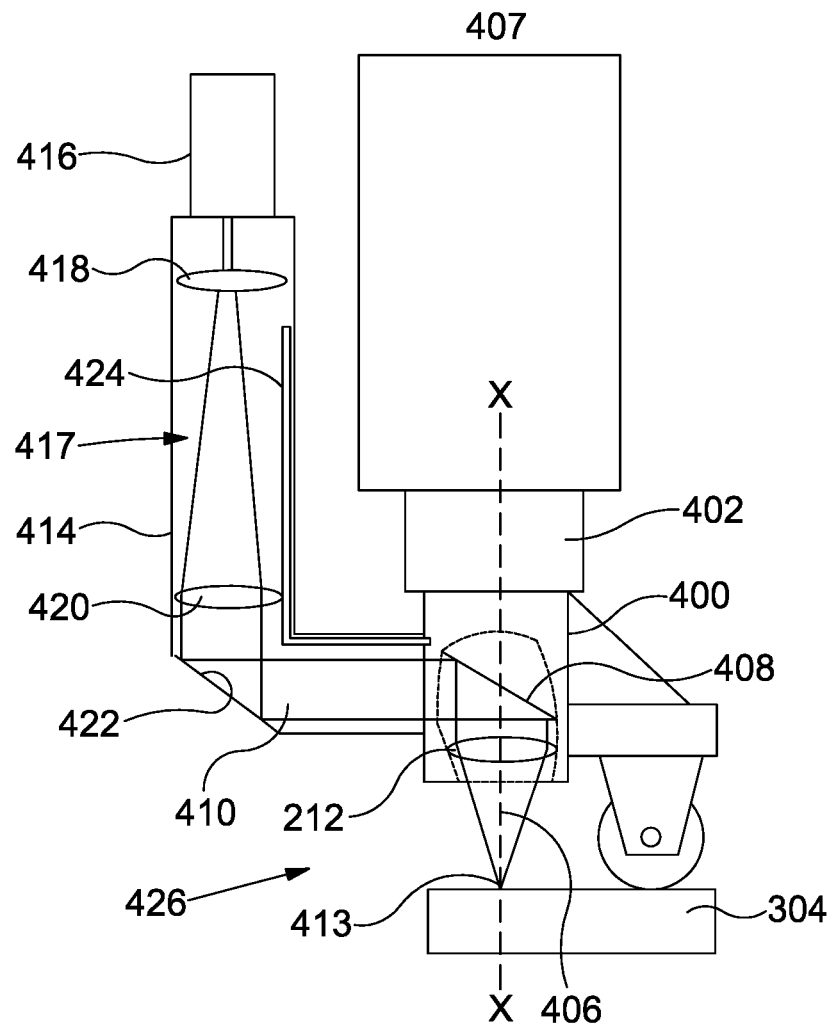
Figure 34:
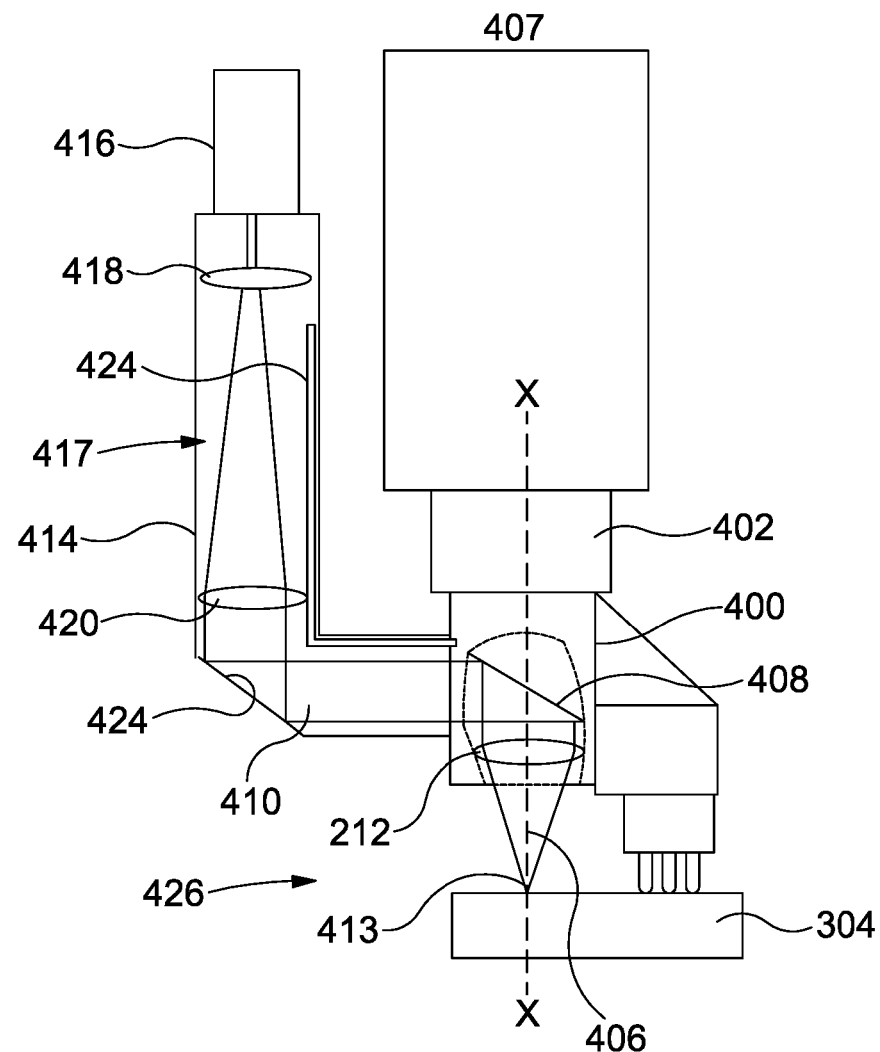
Figure 35:
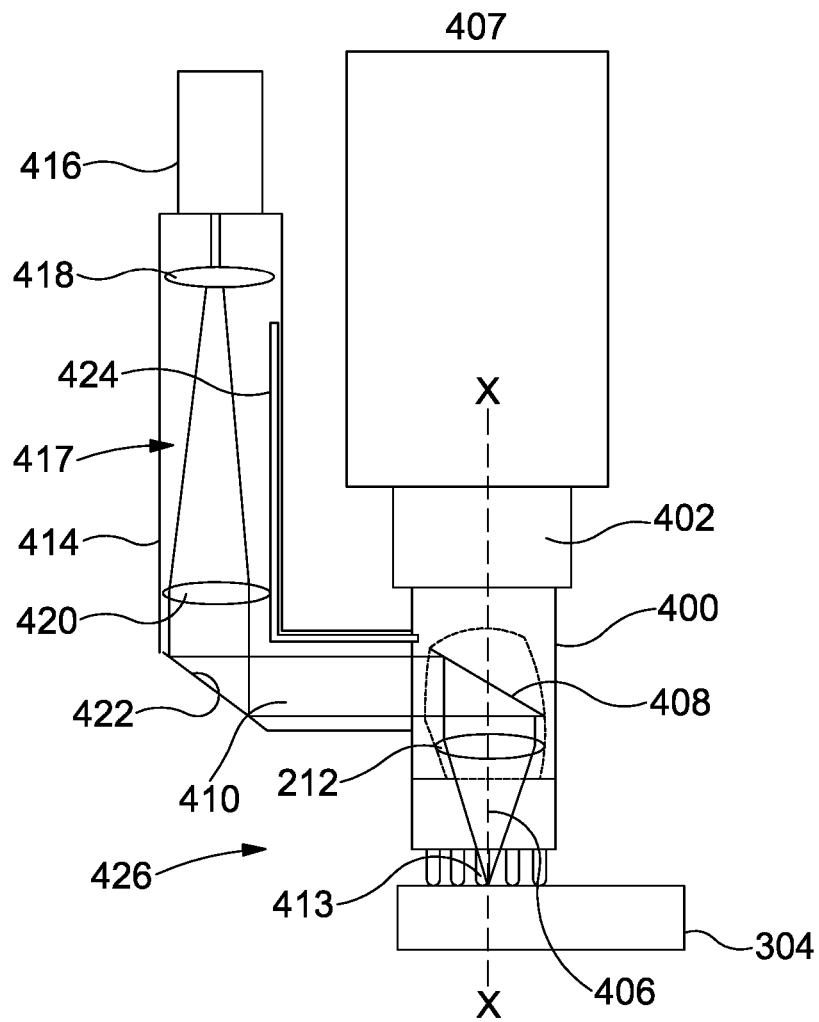
Figure 36:
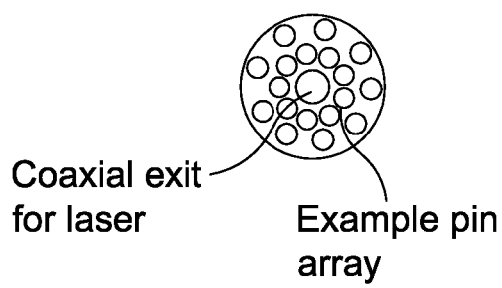
Figure 37:
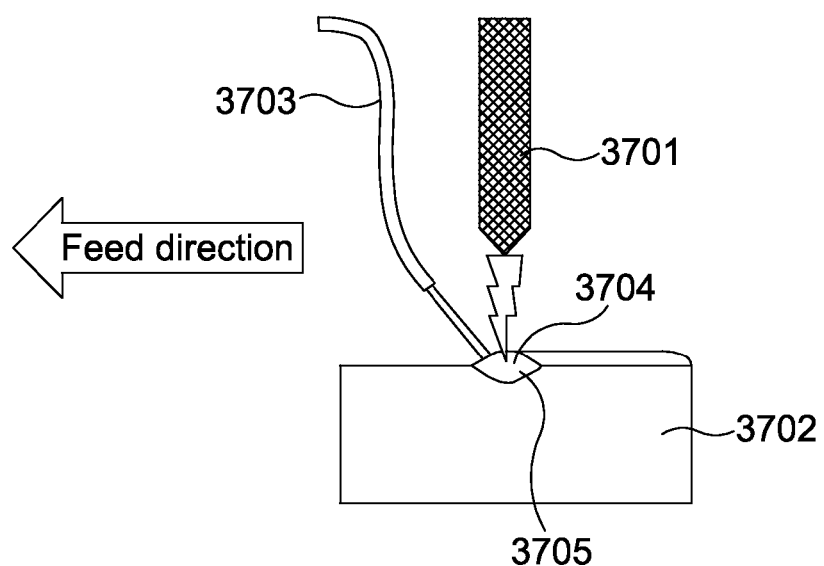
Figure 38:
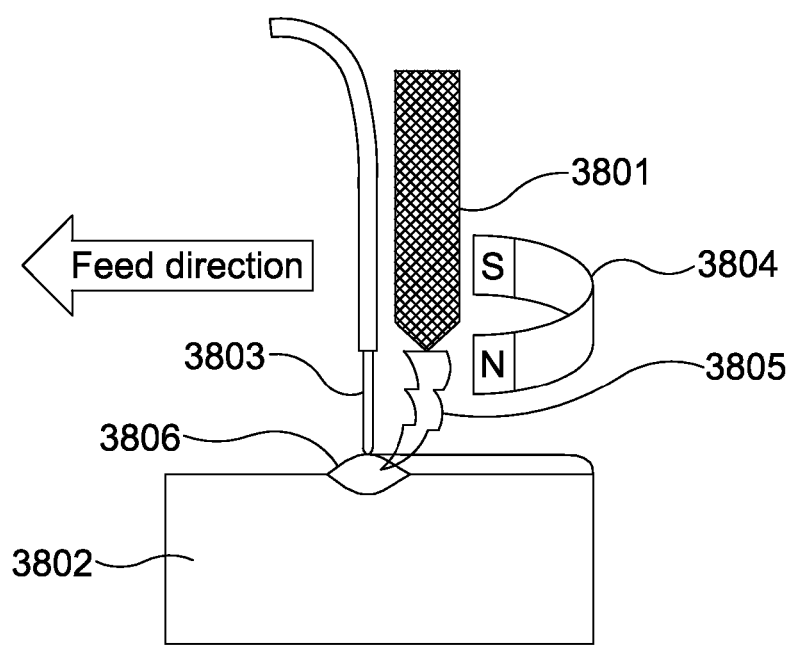
Figure 39:
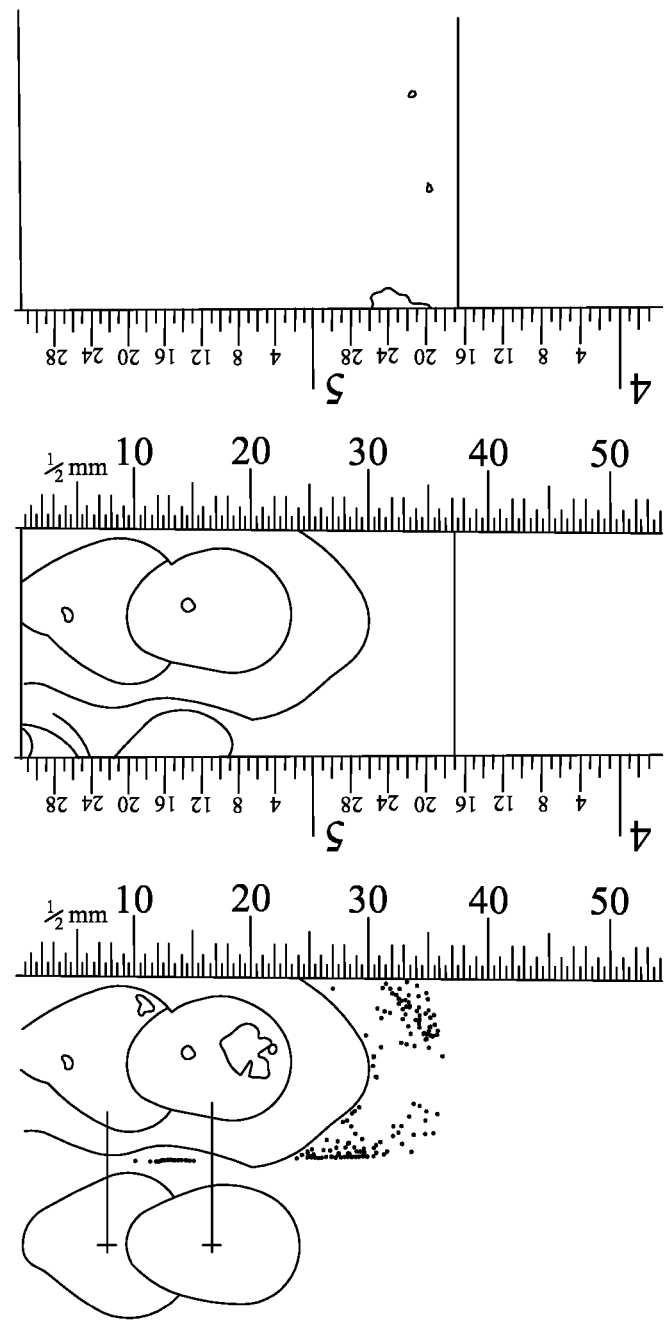
Figure 40:
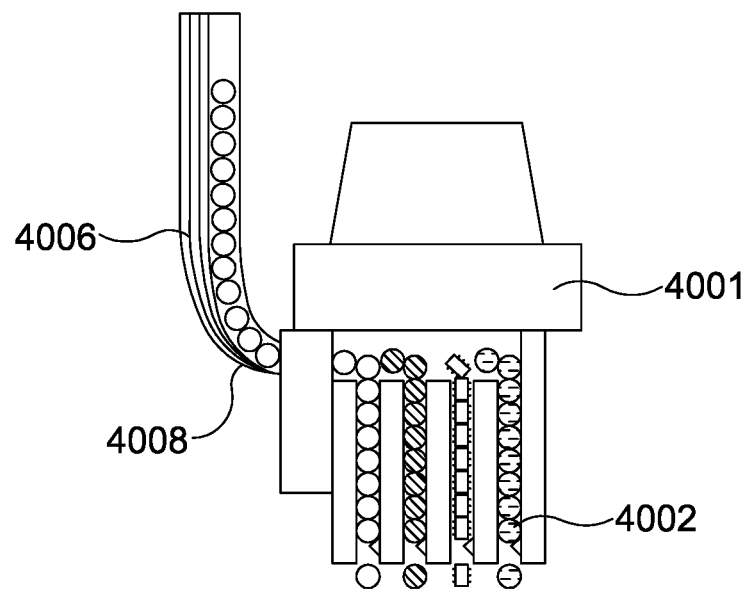
Figure 41:
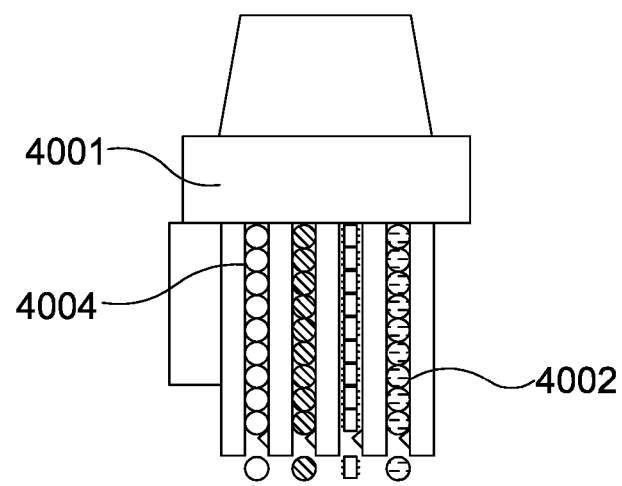
Figure 42:
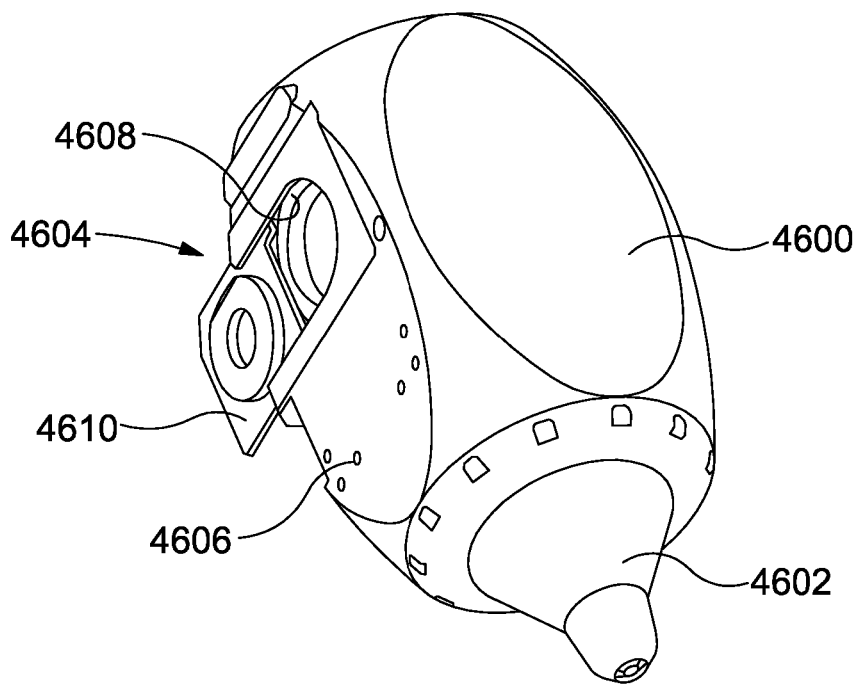
Figure 43:
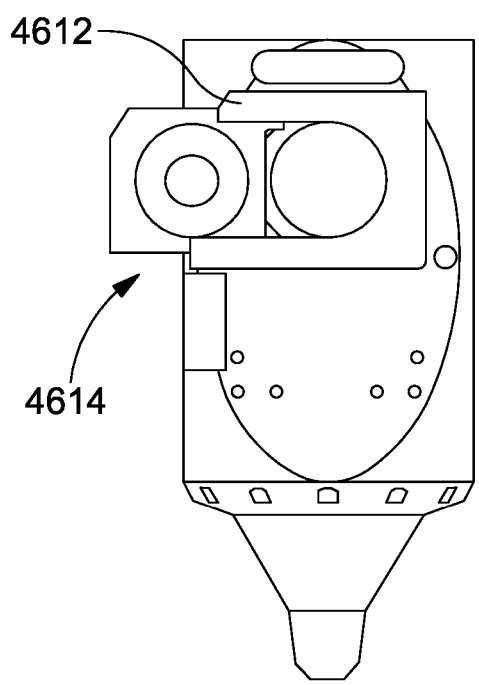
Figures 44, 45:
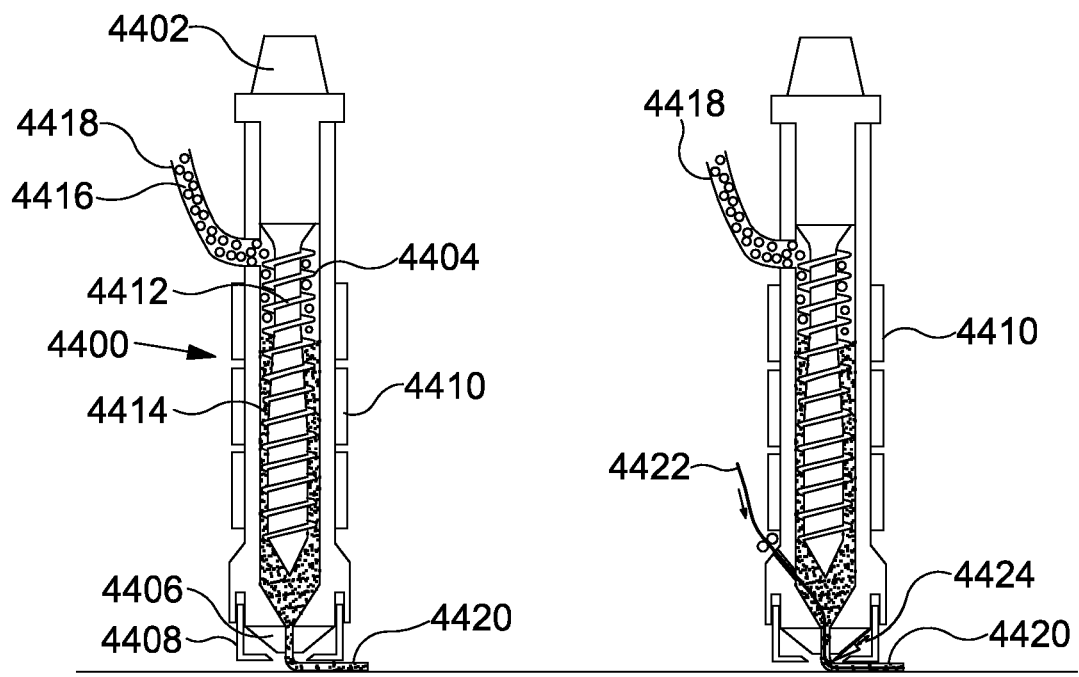
Figure 46:
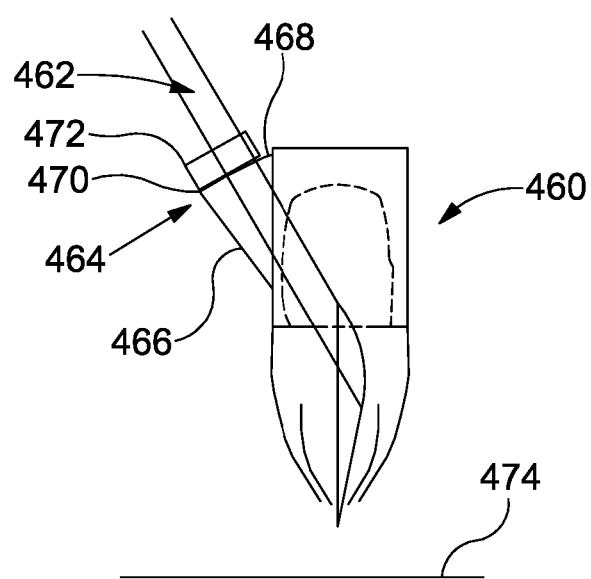
Figure 47:
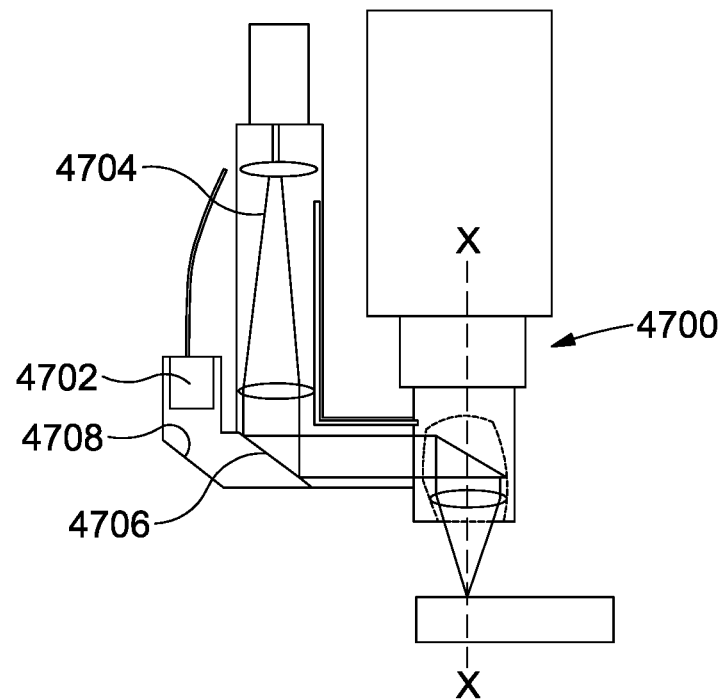
Figure 48:
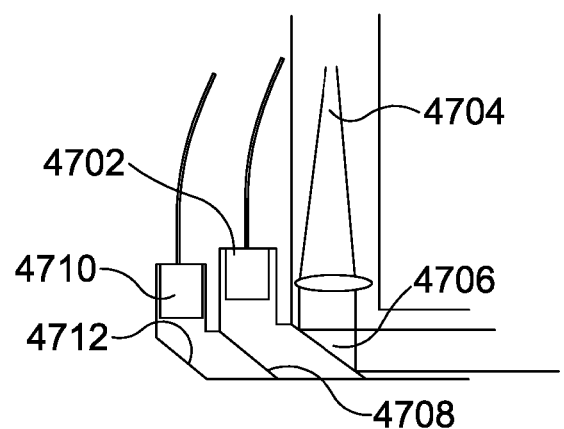

FIG. 10a and b (Prior art) shows how material removal is used to finish an article fabricated from an additive process;

FIG. 11a and b (Prior art) shows the effect of varying layer thickness in fabricating an article;

FIG. 12 shows an example machine tool;

FIG. 13 (Prior art) schematically shows a section through a machine tool head; and FIG. 14 shows a variety of different machine-tool heads;

FIG. 15 shows a variety of different machine tool heads with associated spatial and power outputs;

FIG. 16 shows a flow chart outlining an embodiment;

FIGS. 17a to 17c show results of the method described in FIG. 16;

FIG. 18 shows the results of a further example using the flow chart of FIG. 16 with a different desired finish;

FIGS. 19a to 19d show embodiments which are used to process an internal feature of a work-piece;

FIGS. 20a and 20b shows an embodiment which uses a support material;

FIG. 21 shows a further embodiment using a support material;

FIG. 22 shows a further example of a processing-head;

FIG. 23 shows a further embodiment in which a material is used to couple the work-piece to a processing-head;

FIG. 24 shows a cross section through a processing head for using in the method outlined in relation to FIG. 23;

FIGS. 25a to 25e show examples of power distributions that can be selected;

FIGS. 26a to 26e show spatial power outputs that can be achieved;

FIG. 27 shows a processing head with a chisel tip;

FIG. 28 shows a processing head with a single pin tip for peening;

FIGS. 29a to 29d show alternative pin tips for peening;

FIGS. 30a to 30e show a selection of roller tips suitable for peening;

FIG. 31 shows a processing head having a tip with vertical and horizontal rollers;

FIG. 32 is a side view of the head of FIG. 31;

FIG. 33 shows a variation of a processing head having a combination of laser processing and rolling;

FIG. 34 shows a variation of a processing head having a combination of laser deposition and a peening tip;

FIG. 35 is a variation of the processing heads of FIG. 34;

FIG. 36 is an alternative peening head;

FIG. 37 is a Prior Art deposition head;

FIG. 38 is a modified deposition head;

FIG. 39 shows the movement of the melt pool achieved;

FIG. 40 is a processing head arranged to supply a number of components and in which the components are replenished through a dock; and FIG. 41 is a processing head similar to that of FIG. 40 in which the components are stored in a reservoir in the processing head;

FIG. 42 shows a perspective view of a processing head having a side opening with a closure moveable between an open and a closed position;

FIG. 43 is a side view of the processing head of FIG. 42;

FIG. 44 is a schematic sectional view of a processing head for adding material and applying pressure;

FIG. 45 is a schematic sectional view of an alternative head;

FIG. 46 is a schematic view of a docked laser processing head;

FIG. 47 is a side view of a processing head with a laser beam delivery and a sensor for feedback and monitoring; and FIG. 48 is a schematic view of a modification of the head of FIG. 47 to include multiple cameras.

Figure 1:
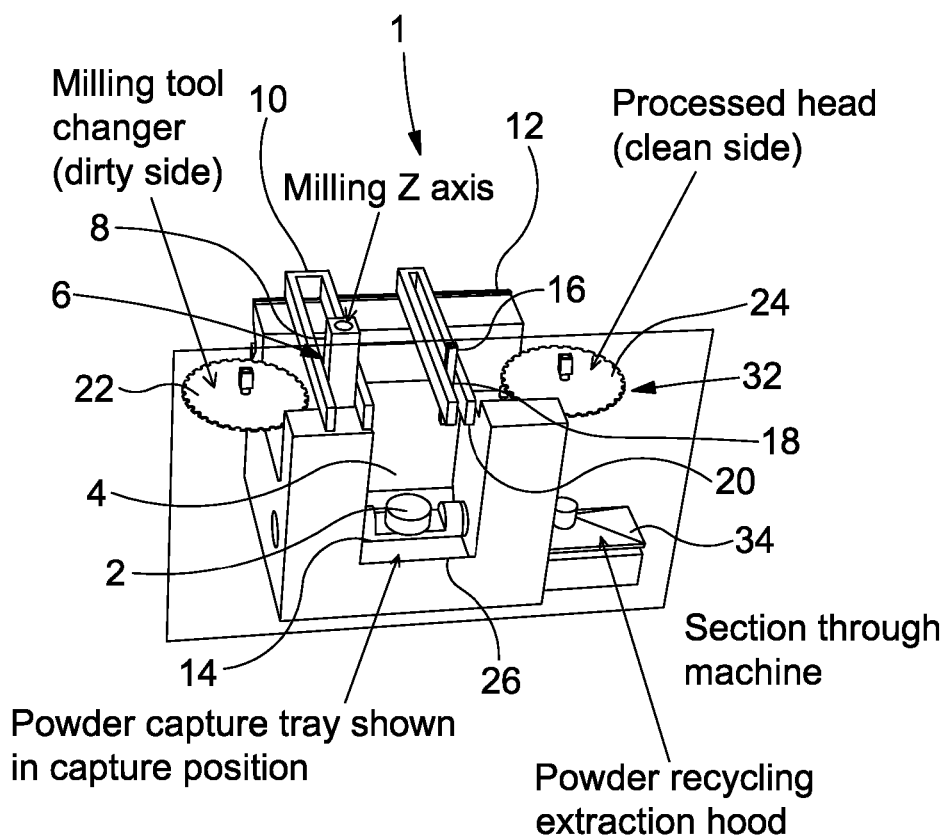

FIG. 1 shows partial cross section and perspective view of a machine 1 in accordance with an aspect of the invention in which the machine arranged to carry out removal and addition of material on a work piece 2. The work piece 2 is located in a work station which is in a chamber 4. The machine has a first device 6 arranged to remove material from the work piece.

The first device comprises a first carriage 8 arranged to move on a first support 10. The support 10 is able to slide on a first 12 and a second rail (not shown) in an x direction. The carriage 8 is moveable on the support 10 in a y direction. The carriage is movable in a z direction between the support 10 and the work piece 2.

In this embodiment the work station comprises a work platform 14 that is a fixed table.

The machine comprises a second device 16 arranged to process the work piece. The second device 16 or mechanism comprises a carriage 18 mounted on a second support 20. The second support 20 is also arranged to slide on the first rail 12 and a second rail in an x direction. The second carriage 18 is adapted to move in a y direction on the second support 20.

A first and a second tool changer 22, 24 are provided. A number of first processing heads are stored in the first tool changer 22. The first processing heads are heads arranged to mill, cut, drill, plane the material of the work piece 2. These processes are considered to be "dirty" and typically produce waste material. It is not as important to keep the work piece 2 clean during these processes.

The machine 1 is arranged such that in use the first carriage 8 moves adjacent the first tool changer 22 and a suitable processing head is selected. The processing head is moved to a docking position and docks with the carriage 8. The carriage 8 is moved to the chamber 4 and moves in the z direction to bring the first processing head (that is clamped to the carriage 8 via a clamp) into position to process the work piece.

As can also be seen in FIG. 3 a powder catching tray 26 is placed in the chamber 4 below the work platform 14 to catch any waste falling from the work piece 2. A coolant and waste removal fluid is supplied to the work piece by means of a channel in the first carriage 8. The coolant fluid is removed from the chamber 4 though ducting in the machine 1. The chamber has a floor 28 sloping to a channel 30 connected to the ducting. Swarf or other waste material falling from the work piece can be removed from the chamber 4 along the channel 30 and ducting along with coolant material.

Once the first processing head has finished processing the work piece 2 the first carriage 8 moves in the z direction to remove the processing head from the work piece. The first carriage then moves in the y direction and the x direction to bring the first carriage 8 to the first tool changer 22. The first processing head is detached from the first carriage and moved into the first tool changer. While the first carriage is in use the second carriage is in an inoperative position.

Preferably the first device 6 comprises the first carriage 8 on which a plurality of interchangeable processing heads can be removably mounted in use and the interchangeable processing heads are storable in a first tool changer 22. The second device comprises a second carriage 18 on which a plurality of interchangeable processing heads can be removably mounted, the removable processing heads for the second device being storable in a second tool changer 24.

Desirably each tool changer has a number of processing heads stored therein. The first tool changer preferably stores processing heads designed to remove material from a work piece. Such heads may be arranged to carry out milling, grinding, planning, boring, ablation, machining and other material removal processes as are well known in the art. The machining may be laser assisted and the processing head may utilise coaxial laser delivery or off-axis laser delivery. The second tool changer 24 stores second processing heads 32. The second processing heads 32 are used for processing and for additive processes and are kept and used in an environmentally clean conditions.

Figure 2:
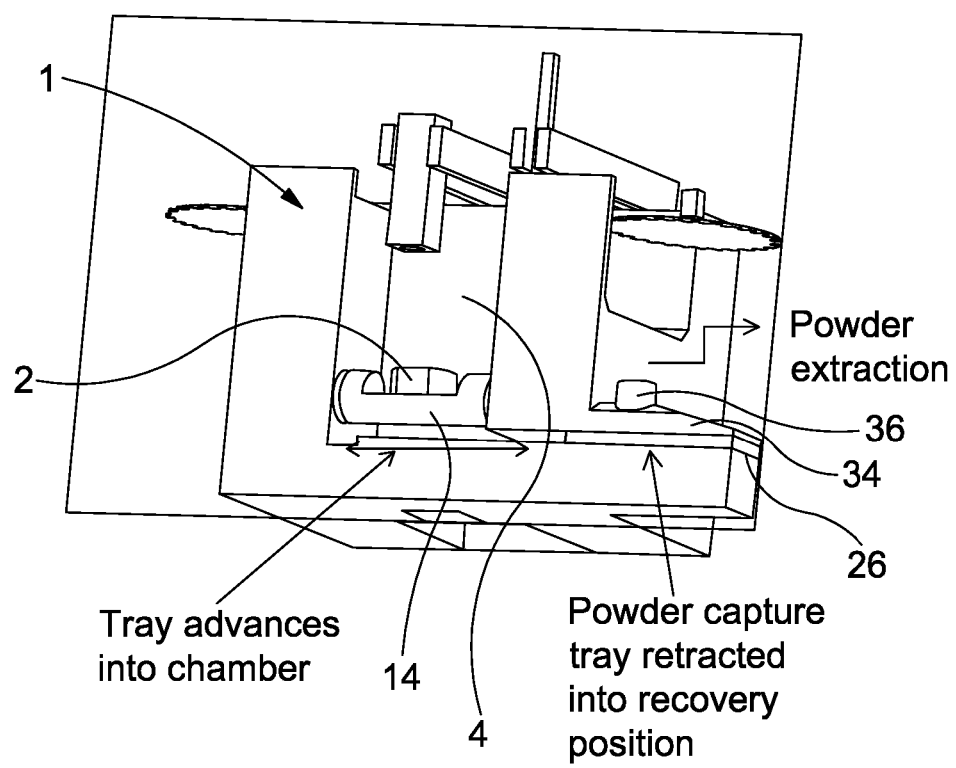
FIG. 2 is a section through the machine of FIG. 1.

Turning now to FIG. 2 which shows a section through the machine 1 it can be seen that the work piece 2 is placed on a platform 14 within the chamber 4. The powder capture tray 26 is in a retracted position under a powder recycling extraction hood 34 from which powder can be extracted and recovered for re-use. In the retracted or recovery position the powder capture tray is located on the clean side and a duct 36 from the extraction hood is located below the clean tool changer 24.

Figure 3:
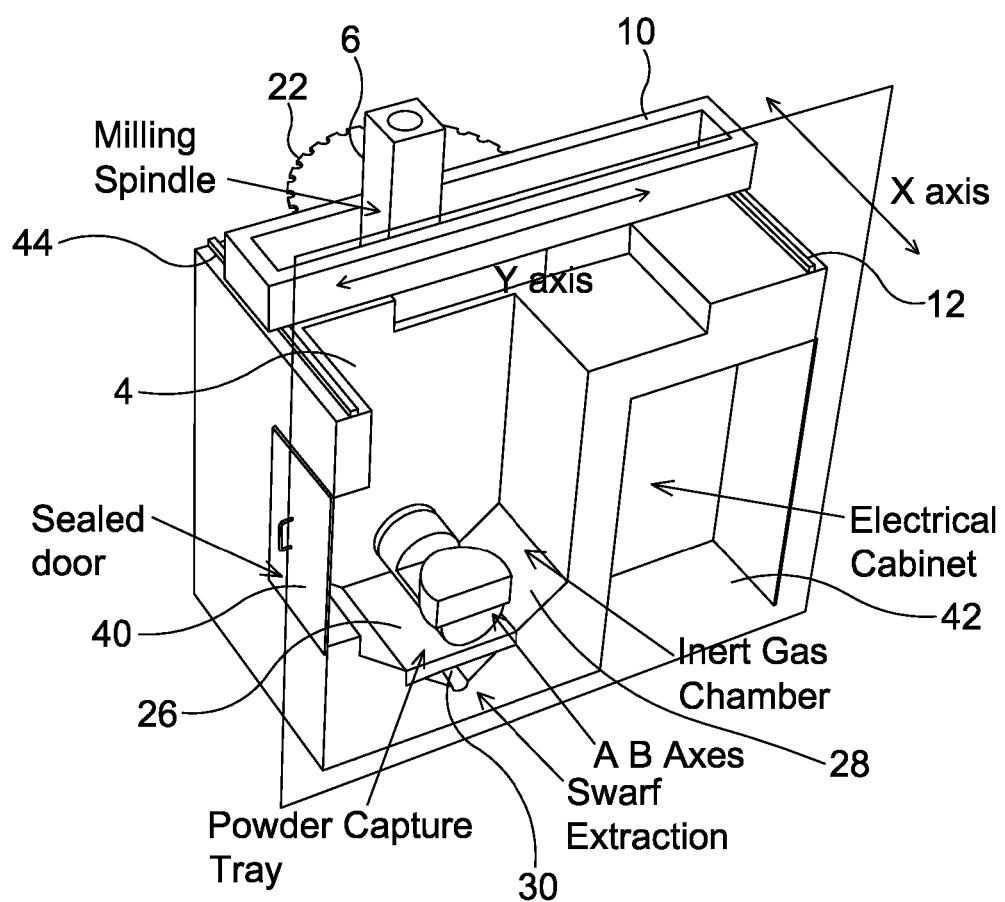
FIG. 3 is a cross section of the machine at right angles to the section of FIG. 2.

FIG. 3 is a cross section of the machine and the section is at right angles to the section of FIG. 2. The powder capture tray 26 is shown in position in the chamber 4 below the work piece. The chamber 4 is provided with a sloping floor 28 leading to an extraction channel 30 in the base of the floor. When the powder capture tray 26 is not in position in the chamber, swarf or other waste material from the work piece 2 falls to the floor 28 and descends the slope to the channel 30 at the bottom. From the channel swarf and other waste can be removed via an extraction duct 38 as will be described below.

In this embodiment the chamber 4 is provided with an access door 40 which can be sealed to be air tight.

The platform 14 for the work piece in the chamber is movable in 2 axes A and B. It will be appreciated that the platform 14 may be arranged to move in more axes if desired.

As can be readily seen the machine has an electrical cabinet 42 adjacent the chamber. The electrical cabinet 42 houses the necessary connections and controls for the machine.

It will be appreciated that the work station, or at least the work holding device will be electrically isolated from the rest of the machine with a separate path to ground. Isolation of the work station enables the use of an arc as a heat source without causing electrical risk to the machine.

In one embodiment the electrical isolation is achieved using a flexible grounding strap for 3 axis machines with a table which is mounted with a polymer concrete or ceramic spacer between it and the underlying machine carriages (axes) to isolate it. In many circumstances on 3-axis machines, it is sufficient to have only the work holding device isolated and grounded. However 5-axes machines can be more difficult and tilt-rotary tables can be very difficult to isolate and ground. In a preferred embodiment the work platform is isolated by a ceramic or polymer concrete insulator between it and the underlying carriages. Grounding is achieved by using a set of carbon brushes that encircle the entire platform which is generally circular or substantially circular, such that it is free to rotate continuously but there is always a path to ground through the carbon brushes all the way around.

The first rail 12 on an upper portion of the machine can be seen along with the second rail 44 positioned opposite the first rail and parallel thereto. Each support is moveable on the first and second rails. As can be readily seen the first carriage 8 is arranged to be moveable in the y direction along the first support 10. The first carriage 8 is on the "dirty" side and is arranged to select a first processing head from the first tool changer 22 which is visible at the rear of the machine. The first and second supports 10, 20 may slide on ball screws received in the first and second rails 12, 44.

Figure 4:
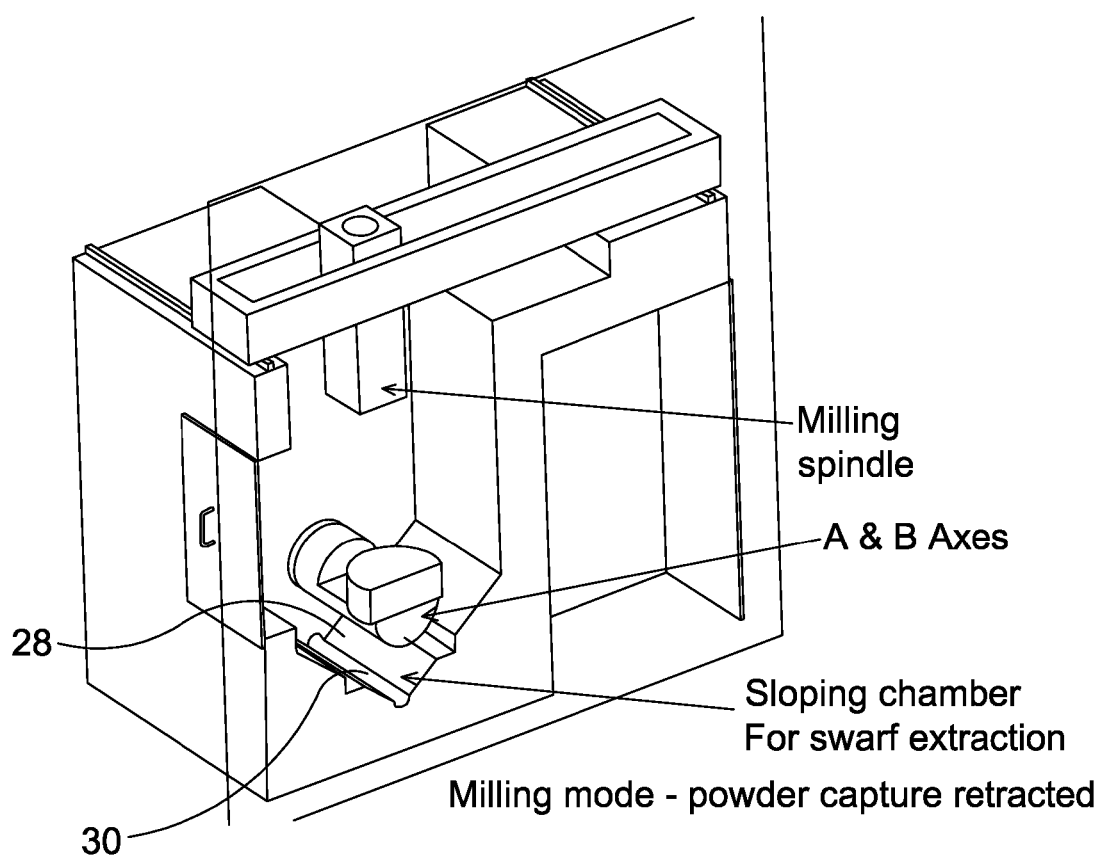
FIG. 4 is a different view of the section of FIG. 3.

FIG. 4 is a different view of the section of FIG. 3 and shows the first carriage 8 in position over the work piece 2. In this case the first carriage 8 is in use and material is being removed from the work piece. As such it is to be expected that swarf or other waste material will be removed from the work piece 2 and will be present in the chamber 4. To facilitate removal the powder capture tray 26 is removed and the waste material which comes off the work piece and falls to the floor 28 is removed from the chamber 4 by the channel 30 and ducting 38.

Figure 5:
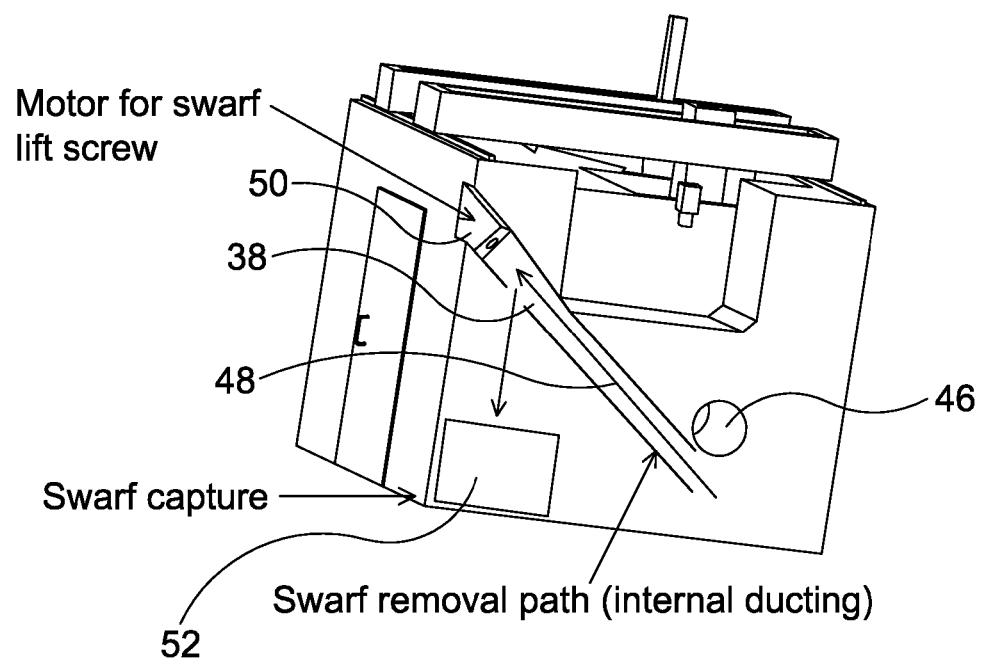
FIG. 5 is a section through the dirty side of the machine

FIG. 5 is a section through the dirty side of the machine and shows the first tool changer 22 and a passage 46 connected to the channel 30 in the chamber 4. The passage 46 leads to an inclined duct 38 having a waste material lift screw 48 which can be an Archimedes screw or other known lifting screws or transporters can be used. A motor 50 for operation of the waste material lift screw 48 is provided at an upper end of the inclined duct 38. Once waste material has been lifted to the upper end of the duct 38 it is transferred to a waste material collection 52. Transfer to the waste material collection is automated.

Although not shown, coolant is extracted from the chamber through the duct 38 and by means of a channel provided in the swarf lift screw 48.

A roof is provided over the machine, but not shown for clarity, and the roof as arranged to be able to slide back to allow access to the machine 1 by a crane and also to allow access for robotic handling.

Also not shown are liners which are used in the chamber and typically comprise a cover or double sealed bellows.

The machine may be constructed on a polymer concrete base to provide stability and robustness without undue weight.

As has been described generally the machine can be used with processing heads that are already known and such processing heads may have been used in connection with additive manufacture or in connection with CNC machining. Such processing heads have been described in the applicant's earlier applications such as WO/2014/013247 and unpublished application numbers: GB 1412843.3 and GB1423407.4.

Figure 6:
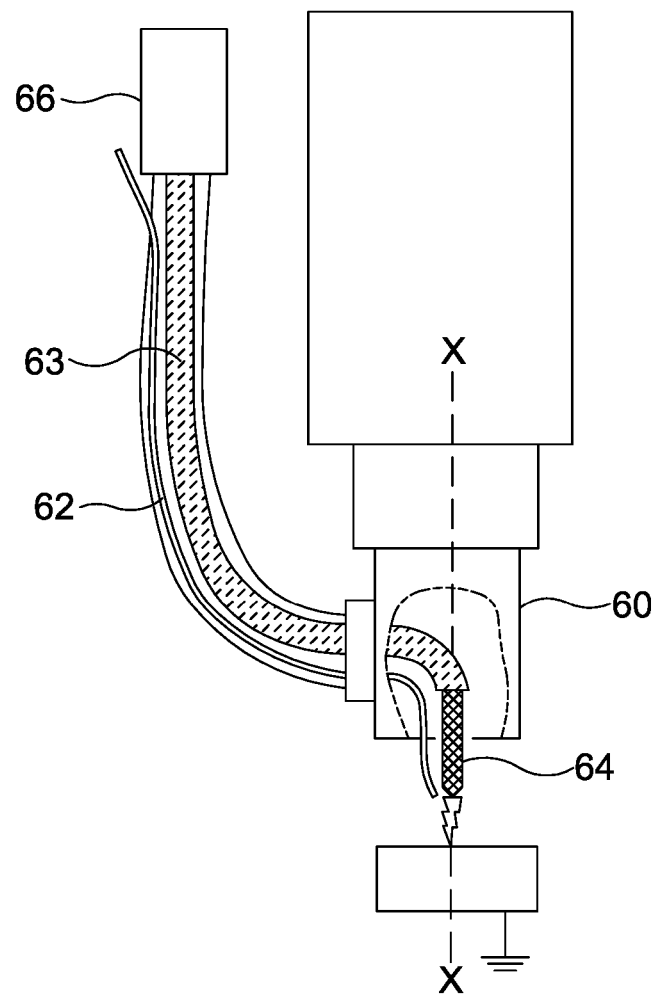
FIG. 6 is a Prior Art processing head.

FIG. 6 is schematic drawing is a processing head which is a prior art processing head. It comprises a head 60 with media feed 62 and energy source 63 delivering energy to an electrode 64 which is connected to a suitable machine by a manifold 66. The manifold 66 is separate from the processing head 60 and it is necessary to arrange for the manifold to be docked and supported through movement of the processing head.

Figure 7:
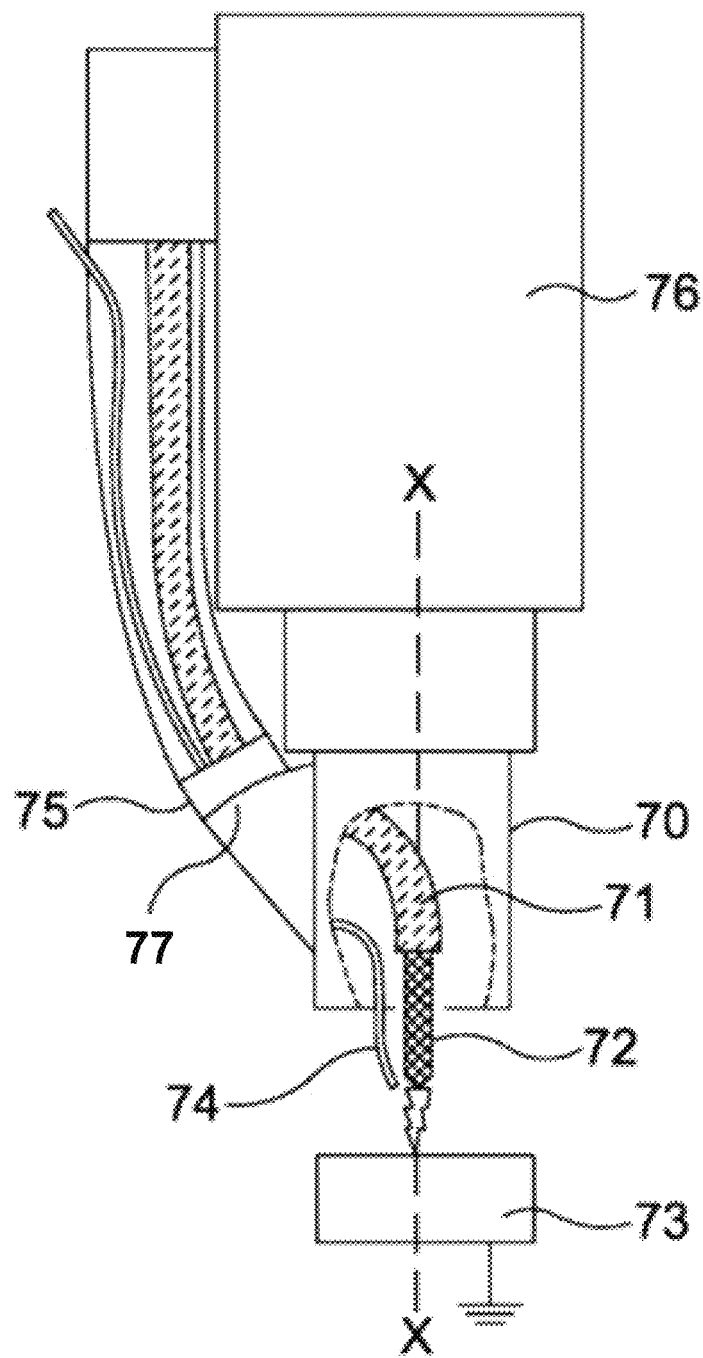
FIG. 7 is a processing head for use in the machine.

FIG. 7 is a schematic drawing of a modified and substantially improved processing head. The processing head comprises a head 70 which is arranged to deliver energy 71 to an electrode 72. The electrode creates a melt pool on the work pieces 73. The processing head also supplies media in the form of a filament 74 to the work piece adjacent the melt pool. The energy and the media are supplied from a supply manifold 75 which is connected to the machine by a connection secured to a carriage 76 on which the processing head 70 is engaged. The processing head 70 has a receiving manifold 77 which is adapted to cooperate with a supply manifold 75. The receiving manifold 77 and the supply manifold 75 cooperate and are docked together when the carriage 76 picks up the processing head 70.

Figure 8A:
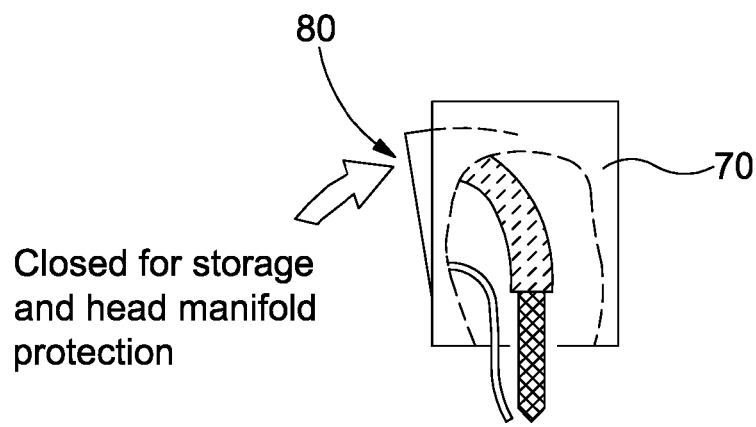
FIGS. 8a and 8b show detail of the processing head of FIG. 7 showing the head in a closed position for storage and an open positon.
Figure 8B:
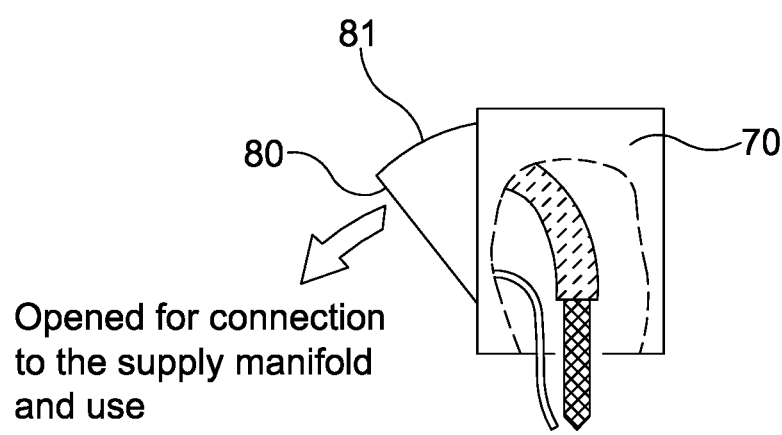

The manifold on a processing head will now be described in more detail in relation to FIG. 8. FIG. 8 schematically shows the receiving manifold 77 in a closed position in FIG. 8*a*. In this embodiment the door 80 rotates to a closed position as can be seen in FIG. 8a. In this position the connections are protected from contamination. In FIG. 8b the door 80 is shown in an open position and connections on the upper surface 81 of the receiving manifold are accessible for connection the supply manifold 75.

FIG. 46 illustrates a manifold on a laser processing head 460. A collimated laser beam 462 is supplied to the laser processing head 460 through the docking manifold interface, generally indicated at 464. The docking interface 464 is arranged to allow a docking motion to be accomplished with the tool mounting motion and the receiving docking manifold 466 has an upper surface 468 which is generally directed upwardly so that the upper surface of the receiving docking manifold 466 comes into contact with a lower surface 470 of the supply docking manifold 472 as the processing head is moved into contact with a spindle on the machine onto which the processing head is mounted. The collimated laser beam is directed downwardly by the laser processing head and is applied to the work pieces, generally indicated at 474.

Figure 9:
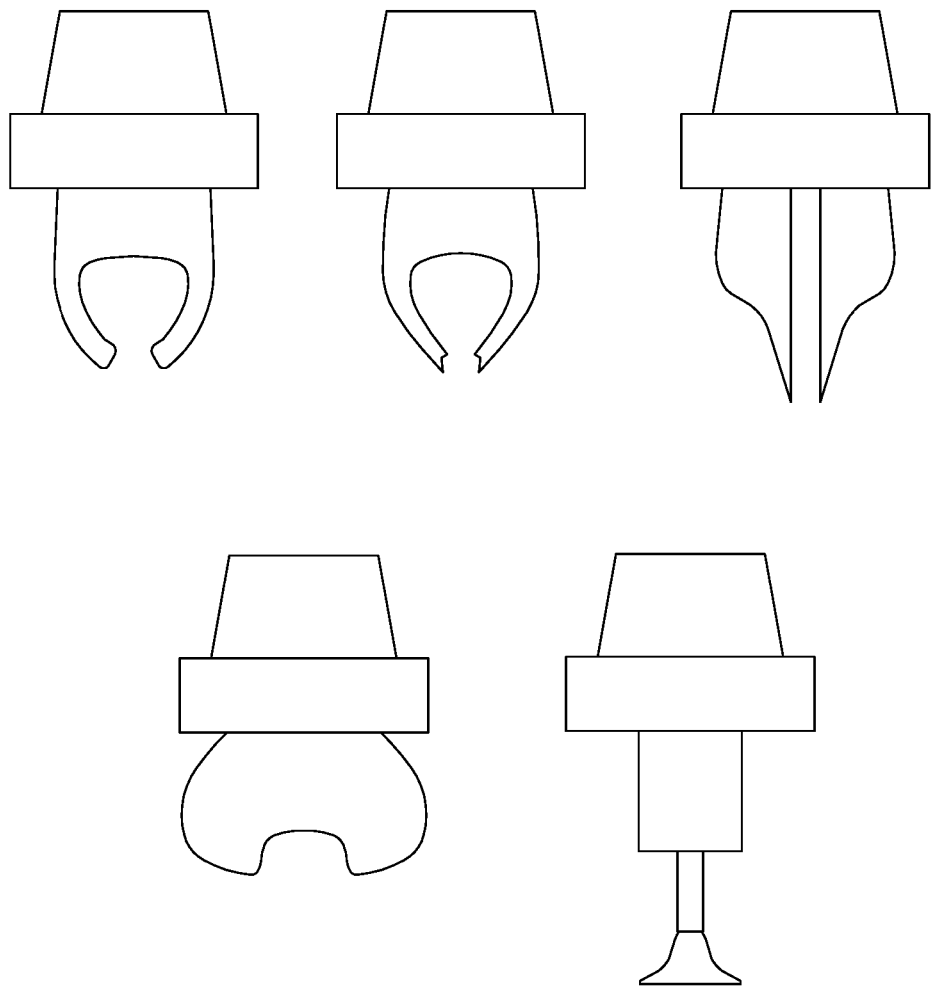
FIG. 9 shows examples of grip and place processing heads.

An alternative manifold is described below with reference to FIGS. 42 and 43. FIG. 9 illustrates a number of pick and place grabbers. These end tools can be fixed to a processing head and can be utilised between processing steps to place material on the work piece, to remove a portion from the work piece, to add or move components. They may be particularly useful for adding components to the work piece part way through a build process. These are particularly useful in increasing the automation of the build process and reducing the number of personnel interventions that have to be made. Improved automation also enable the clean environment to be maintained and improved.

The pick and place grabbers are particularly suited for combination with a head having a magazine of components that can be applied to a work piece. It is sensors or chips can be dispensed by the magazine and then placed in position on or in the work piece by a suitable pick and place grabber as illustrated in FIGS. 40 and 41.

FIGS. 10a and b show a portion of an article 100 which is being fabricated using Additive Manufacturing (AM) combined with a material removal technique. In particular, FIG. 10a shows a stepped surface 102 which results from building up the article 100 as a series of layers as is the case in AM where the process uses a series of layers to fabricate. The final intended surface of the article is seen in FIG. 10a as a stepped line 104 connecting the inner corners of the steps 102. Thus, in order to create that intended surface 104 it is then necessary to remove material from the article 100 extending beyond that intended surface 104.

Figure 10B:
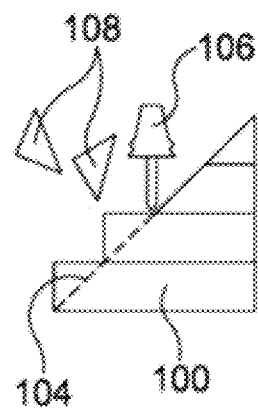

FIG. 10b shows the process of using, in this embodiment a Computer Numerically Controlled (CNC) machine head 106, to remove material 108 to provide the finished, intended, surface.

It is also possible to generate articles, or at least portions thereof, in which material does not follow the deposition steps used in AM and a brief discussion of this follows with reference to FIG. 11. Reference to article herein should be interpreted to mean not only the entire article, but also a portion of an article.

Figure 11B:
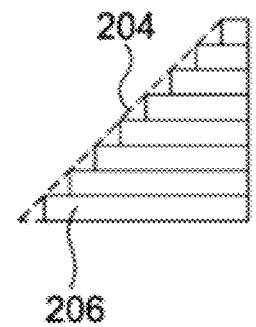

FIG. 11 illustrates that as the depth that is laid down in a single pass of the AM process then the roughness of the finished surface increases but the speed at which the article can be fabricated is normally increased as more material is laid down in a single pass. Thus, in FIG. 11a it can be seen that the intended surface 200 of the article 202 has larger steps within it when compared to the intended surface 204 of article 206 as shown in FIG. 11b in which less material has been laid down in each pass of the AM process. Accordingly, in the prior art a choice is made, unless post processing material removal is to be used, as to whether to fabricate the article quickly by laying down more material in each pass, or whether an improved surface finish is required thereby reducing the speed at which the article can be fabricated.

The skilled person will appreciate that regardless of the step size used (ie the amount of material laid down in each pass of the AM process) it would be possible to remove material to provide the finished surface as described in relation to FIG. 10. However, the amount of material and therefore waste and time needed to do the material removal will be determined by the step size (ie the amount of material laid down in each pass of the AM process) used to fabricate the article, or part thereof.

FIG. 12 shows, schematically, a machine-tool 300, which typically comprises a processing head 302 held in a clamping mechanism of the machine-tool 300 and arranged to process a work-piece 304 (such as the article 100 of FIG. 10) held in a work volume. Typically the work-piece 304 is held within the work-volume by an additional clamping mechanism such as a vice, or the like. Further, the machine-tool 300 is usually controlled by a controller 306 (which may be thought of as a computer) which controls the position of the processing-head 302 as it processes the work-piece 304.

Most machine-tools 300 are arranged such that the processing-head 302 can be interchanged with other processing-heads 302 in order that the correct processing-head 302 is provided for the task at hand. Providing the example of milling machine, then a first processing-head may be provided for coarse material removal, whereas a second processing-head may be provided for fine material removal. In the case of material removal, such as milling, then the processing head may often be referred to as a machining-head or milling cutter.

As such, machine-tools 300 have tool-changers 308 which can, typically under the control of the controller 306, automatically change the processing head 302 being used by the machine-tool 100 to process the work-piece 304. Typically, the tool changer will also be under the control of the controller 306. In the Figure shown, four further processing heads (which may be machining heads) 310, 312, 314, 316 are shown in a storage location 308 in addition to the processing head 302 already in the machine tool 300.

FIG. 13 illustrates a processing-head 400 which connects to the machine-tool 100 using the clamping mechanism 402 of the machine-tool 100 and which can be stored in a store of processing-heads 308 (ie a tool changer) and automatically connected to the machine-tool 100 with a tool-changer thereof. Here the tool-changer 308 may provide a storage-location for processing-heads, machining-heads, etc. which are not currently being used by the machine-tool 100. Discussion herein refers to a clamping-mechanism 402 and it is assumed that a spindle 401 into which the clamping mechanism 402 connects is part of the machine-tool 100.

In the embodiment being described, the processing head 400 is arranged to focus a laser beam 406 onto the work-piece 304. In other embodiments, other energy sources may be utilised instead of the laser. Thus, the processing head is arranged, under the control of the controller 306, to process the work-piece 304 with the focused laser beam 406 (or other energy source).

In FIG. 13, a section is shown through the processing-head 400 and it can be seen that a reflector, such as a mirror 408, arranged to move an incoming laser beam 410 through ninety degrees to be incident upon a focusing-lens 412 for creation of the focused-laser beam 406.

In addition to the laser beam and optical components, the processing-head 400 also contains one or more ducts to deliver a media. For the example, the media may comprise a polymer, ceramic and/or metallic powder within a transport fluid which is arranged to be melted by the energy source. The processing is arranged such that media is delivered through the processing-head and is passed into the energy source such that it is molten or at least semi-molten before the media reaches the work-piece 304. As such, the processing-head can be used to deposit material onto the work-piece and provide a deposition system, which may for example be used to repair parts. Thus, the processing head may be utilised in an Additive Manufacturing process.

The machine tool (including a spindle 401) and the clamping-mechanism 402 have a longitudinal axis, represented by the dashed line XX in FIG. 13. Should a machining-head (such as a milling cutter) be present within the clamping-mechanism 402 then it would rotate about the axis XX. Conveniently, the energy source, which in the embodiment being described is the laser-beam 406, is focused onto a point, area, etc. 413 that lies substantially upon the axis XX on the surface of the work-piece 304.

In other embodiments, the focusing-lens 412 may in fact be arranged to cause a divergent beam, such as would be the case for pre-heating the substrate (and as illustrated by the processing head 316 in D FIG. 14), heat treating the work piece or in some types of thermal spraying and the like.

Although not shown in the drawings, some embodiments of the invention may be arranged to transmit an energy source through a spindle 401 of the machine tool along the axis XX; ie from the region of point 407 shown in FIG. 13. In such embodiments the supply-unit would supply media to the processing head 400.

In other embodiments, regardless of whether the energy source is provided from region 407 or from elsewhere, it may be preferable to deposit from a position offset from axis XX.

Adjacent to the processing head 400 and clamping-mechanism 402 there is provided a supply-unit 414 which provides a housing in which various components are housed. The processing-head 400 comprises a processing-head docking-manifold 401 and the supply-unit 414 comprises a supply docking-manifold which are arranged to mate with one another to connect the supply-unit 414 to the processing-head 400 in the condition as shown in FIG. 13.

On top of the supply-unit 414 there is provided an energy source 416, which in the embodiment being described is a laser. The laser 416 generates a beam which is transmitted into the supply-unit 414 and passes through a beam expander 417 comprising a first and a second lens 418, 420 respectively. The beam expander 417 is utilised to increase the diameter of the laser beam in order to achieve a better final focus onto the work-piece 304 and reduce the thermal load on the optics.

The supply-unit 414 also comprises a further reflector 422 arranged to reflect the beam of light from the laser through 90 degrees toward the processing head 400 and the reflector 408 therewithin. As referred to the beam may be controlled by the use of variable optics or fixed optics or combinations or arrays of these optics. Examples of the spatial distribution of the laser beam are illustrated in FIG. 26 *a* to *e*. A power distribution of the laser beam may also be varied and examples are shown in FIG. 25*a* to *e*.

The supply-unit 414 also comprises a supply of various media 424 which connects through the manifold to the processing-head 400 when the supply-unit 414 is connected thereto. It will be appreciated that the media may be supplied by docking with the supply manifold of the supply unit. Alternatively media can be supplied from an internal reservoir or cartridge in the processing head.

In some embodiments the media may be a suitable powder and may be supplied from a side of the processing head through a port or annular supply line. Supply of the powder to the work piece may be through a side feed or preferably through coaxially directed ports or a coaxial annular outlet.

Alternatively the media may be provided in the form of a metallic wire or polymer filament and may be supplied from the supply unit. The wire may be fed along guides coaxially to the work piece or may be provided in multiple feeds from the processing head to the work piece.

In some cases the media may be a fluid and may be a gas used for inert shielding or shaping of the work piece. A gas may be supplied to the processing head from the supply unit. Liquid fluids may be used for cooling of the processing head as will be described in more detail below. Liquids may also be used for coupling of the processing head with the work piece for ultrasonic cleaning, abrasion or inspection. In some other embodiments a liquid may be used as a media for confinement of energy pulses as used in laser shock peening of the work piece.

The skilled person will appreciate that the area 426 around the work-piece 304 is typically referred to as the working area (or volume) of the machine-tool.

FIG. 12 shows a variety of processing heads 310-316 that are, in the embodiment being described, held within the tool changer 308. The skilled person will appreciate that the particular heads that have been chosen to illustrate this embodiment are examples only and other embodiments will likely utilise other processing and/or machining heads.

The embodiment of FIG. 12 may thus be used in a hybrid methodology which uses the tool changer as an automation system to allow both AM to be provided as well as material removal, inspection, and the like. Such a hybrid methodology reduces the cost and complication normally associated with work-piece 304 transfer between technologies done up until now by human operators, robots, or other automation solutions. There is no inherent limitation to the types of technologies which can now be mixed and deployed including multiple additive, subtractive and inspection technologies.

The use of a tool changer 308 allows convenient changeover of a variety of laser processing heads—each with optimized optics, powder focus, and shielding gas for a specific task (as illustrated in relation to the head shown FIG. 13). Using a selection of different heads opens up a wider range of effective operations than is typically achieved using a single processing head. Other embodiments may use processing heads which use an energy source other than a laser, or which use laser based processing heads providing functions other than as described herein.

FIG. 14 shows, in more detail, the processing heads 310-316 of the embodiment being described. Other embodiments, may of course use other heads. The first head 310 is a conventional co-axial laser cladding head. The second head 312 is a laser cladding head with optics for optimizing the power distribution within the laser focus for a high power multi-mode laser. The third head is a laser cutting head with optimized profile and high pressure/velocity inert assist gas 314. The fourth head 316 has a parallel or divergent focus head used for cleaning (including for removal of coolant residue), preheating, annealing, heat treatment, etc. Using this set of heads 310-316 the embodiment being described can process the work-piece 304 in a variety of ways. For example, in the repair/restoration of a turbine blade any holes covered over during cladding can be re-opened by laser drilling in the same setup by changing the processing head 310-316 used by the machine tool 100.

FIG. 15 shows in more detail the processing heads and some alternative spatial distributions and the associated power outputs that can be selected. The spatial output may be controlled by selecting the optic in the laser processing head. The optics may be variable or fixed. Variable optics can be selected from free form mirrors, galvanometer(s) and digital mirror devices.

This is an example of how hybridizing increases the flexibility of current tools. Combining laser processing with in-machine inspection then builds another layer of in-process quality assurance in a system which can actually correct problems arising (by detection, removal and re-addition of material) before parts simply become expensive scrap.

A processing head combining laser processing and inspection is illustrated in FIGS. 47 and 48. FIG. 47 illustrates a laser processing head corresponding to that described with reference to FIG. 13. In this embodiment the processing head 4700 is provided with a second processing function in the form of a camera or sensor 4702. Although the use of cameras positioned to view the melt pool is known in the art, the ability to introduce a camera into the work area to augment one or more deposition heads through the dockable manifold provides the ability to monitor through heads which are amenable to such and to have it safely removed from the working area when it is not in use. The camera 4702 is provided adjacent a feed for the laser beam 4704. The laser beam 4704 is directed to a partial reflector 4706 which directs the laser beam energy toward the axis of the spindle. The partial reflector 4706 allows coaxial viewing through the reflector.

A second reflector 4708 is provided and this allows the camera a coaxial line of sight in the laser beam delivery. The camera is designed to provide in process feedback and monitoring of the work piece and can be adapted to provide in process feedback on the function of the laser processing head.

It will be appreciated that the camera could be mounted without the use of the second reflector by mounting the camera with a direct line of sight to the partial reflector. Optionally multiple cameras may be used to monitor different spectra. It will be appreciated that it is straightforward to mount alternative sensors on the head to monitor other data from the work piece or from the head as is schematically illustrated in FIG. 48. A first camera 4702 is mounted adjacent the laser beam feed and has a coaxial line of sight to the laser beam by reflector 4708 and partial reflector 4706. A second camera 4710 is mounted adjacent the first camera 4702. A second reflector 4712 provides a coaxial line of sight from the second camera to the laser beam feed.

Some embodiments of the invention may be arranged to deposit dissimilar materials onto the work-piece 304, perhaps by providing a different processing head for each material.

Thus, in an example of how the embodiment being described may be used is described in relation to the flow chart of FIG. 16.

As a first step 600, the machine-tool 300 is arranged to select a first processing head 312 (a laser cladding head) from the tool-changer 308. This head is similar to that described in FIG. 13 and arranged to deposit material (in this case metal) onto a work-piece 304.

The controller 306 is programmed, as is known in the art, to control the machine tool 300 and the processing head 312 to deposit material (step 602) to fabricate the desired article. The skilled person will appreciate that the techniques described herein will be suitable for creating entire articles or modifying existing articles. The modification of an existing article will include the repair of that article.

As described in relation to FIGS. 10 and 11 above, the material deposited by the processing head 312 is built up in layers which leads to steps evident on the outside surface of the work-piece 306. Such steps will also occur on any inside surfaces.

Accordingly, once a predetermined point of the program executed by the controller 306, the machine tool is arranged to dock the processing head 312 back into the tool changer 308 (step 604). The skilled person will appreciate that the predetermined point will be determined by the program. In some embodiments, the predetermined point may when the majority of the material for the article being fabricated has been deposited. In other embodiments, the deposition of the material for the article may occur in an iterative manner: ie some material is deposited, processing heads changed; other processing performed; deposition head returned and further material deposited and such a process flow is described in relation to FIG. 19.

The controller 306 then causes the machine tool to select a second processing head (step 606), which in this example is processing head 310. Looking at FIG. 14, it can be seen that the area onto which the laser beam is focused from the processing head 310 is smaller than the area for the processing head 312. As such, the processing head 310 will deposit material in smaller amounts when compared to the processing head 312. Thus, the processing head 310 may then be controlled to deposit material in finer amounts (step 608).

The controller has a data storage component that is arranged to store information on the parameters of the processing heads in the storage location and is arranged to select a suitable processing head based on the desired article.

In addition the controller can select a processing head adapted to inspect or analyse the work piece. The controller is arranged to select a suitable processing head for further processing depending on the data from the analysing head.

FIG. 17 shows how layers 700a-d deposited by head 312 are of a larger thickness than layers 702a-c deposited by head 310. For example, process step 602 may have been used to deposit layers 700 and process step 604 may have been used to deposit layers 702. The skilled person will appreciate that whilst FIG. 16 shows only a single change of processing heads, other embodiments may provide multiple processing head changes in order to work on the work-piece. Each sequential processing head selected can be controlled by the controller using information from an inspection or analysing head and depending on the work piece to be created.

However, it will also be seen that the head 310 has been used to fill in the stepped nature of the surface part 704 (ie the work-piece) being fabricated. Thus, the surface of the part becomes a closer approximation to the desired surface 706 and the second processing head used in step 606 has been used to improve the fidelity of the article being created to the desired article thereby removing, or at least reducing, the need for surface finishing of the article. Depending on the characteristics of the further heads a higher fidelity to the intended surface may be achieved as shown in FIGS. 17b and 17c.

FIG. 17b illustrates an embodiment where the second processing head allows material 710a-e to be deposited with sufficient resolution that the final, desired surface 706 can be substantially achieved without the need for further processing.

FIG. 17c shows an embodiment in which a liquid has been deposited by the second processing head, and due to the surface tension within that liquid (prior to solidification), the deposited and solidified material 712a-e forms convex surfaces extending slightly beyond the desired 706 final surface.

Once the processing head 310 has been used to deposit the smaller amounts of material in layers 702a-c; 710a-e; 712a-e then the surface may have an acceptable surface finish. If this is not the case then further processing and/or machining heads may be used to further work the work-piece. For example smaller amounts of material could be deposited within the remaining steps (eg 708) between the layers 700 and 702 to make the surface a closer approximation to the desired surface 706.

In alternative, or additional, embodiments a milling head, or the like, may be selected to remove material to provide the desired surface. It will be appreciated that in such embodiments less material will need to be removed when compared to embodiments in which the material layers 702a-c was not deposited by processing head 310. Thus, it will be appreciated that embodiments providing the method as outlined in relation to FIG. 17 provide a surface finish that is either i) acceptable without any material removal; or 2) requires much less material removal to provide the finished surface when compared to an embodiment in which layers 702a-c had not been deposited. In the example, of FIG. 17 the material being deposited in layers 700 and 702 is largely the same but with the rate/amount of material deposition being varied between layers 700 and 702.

FIG. 18 is used to exemplify another example of FIG. 16 in which the material is varied between steps 602 and 606. It will be appreciated that it would also be possible to vary the rate/amount of material being deposited in addition to varying the composition of said material.

As in FIG. 17, process step 602 is used to deposit layers 700a-d and step 604 is used to change the processing head.

In step 606 the second processing head is used to deposit a material having a different property in the layers 800a-d when compared to the layers 700a-d. The skilled person will appreciate that whilst the layers 800a-d are shown, in this embodiment, as being on the faces of the layers 700a-d this need not be the case.

In the embodiment of FIG. 18, the different property is provided by a different micro-structure of material. Specifically, the material deposited in layers 800a-d has a different heat treatment, whilst it could be substantially the same material as that in layers 700a-d, and therefore has a different hardness. For example, the layers 800a-d may constitute a hardened bearing surface, cylinder sleeve of the like. Those trained in the art will appreciate that by varying the processing parameters including energy input, feed-stocks, additives, shielding, that a wide variety of nano and micro properties can be varied including grain size, crystal structure, crystal orientation, and chemistry which have corresponding effects on the hardness, chemical resistance, magnetism, residual stress, dimensional stability, thermal conductivity, electrical conductivity, etc.

In other embodiments, it is possible to change the material between steps 602 and 606. For example, step 602 may be used to deposit a metal and step 606 may be used to deposit a plastic.

In other embodiments similar to that shown in FIG. 18, the layers 800a-d may not be provided by further material and may simply be provided by a heat treatment to the surface region of layers 700a-d. Such surface region treatment may be provided by a heat source, such as a laser, or the like. An alternative treatment will be described in more detail below.

Thus, FIG. 18 is used to exemplify embodiments in which step 606 is used to deposit materials of different properties (whether bulk or nano/micro-structure) when compared to the material deposited in step 602.

Figure 19A:
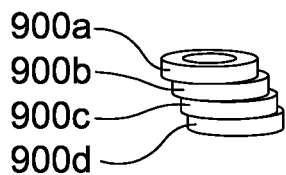
Figure 19B:
Figure 19C:
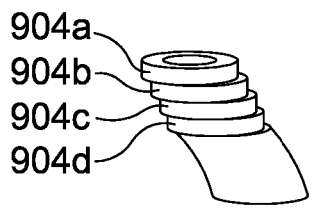
Figure 19D:
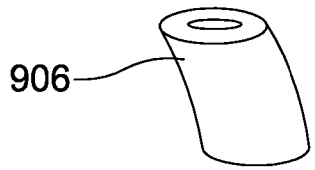

FIGS. 19a-19b are used to exemplify a further example of the process outlined in relation to FIG. 16. Here a first processing head is used to deposit a series of substantially annular layers 900a-d. Each of the layers are shown and thus the interface between each of the layers is visible in the figure. The skilled person will appreciate that this interface between layers 900a-d will be present both on the outside of the annulus of each layer and also on the inside of each layer.

Here the second processing head used in step 606 is a material removal head, such as a milling machine, or the like. However, the material removal is not only used to smooth the outside surface of the layers, as shown at 902 but also to smooth the inside of the annulus in a similar manner.

In other embodiments, further material may be deposited using a second processing head in order to improve the fidelity of the inside surface of the article being created to the desired article in a similar manner to that described in relation to the outer surface in FIG. 17.

As such, the skilled person will appreciate that, in such an embodiment, the number of layers deposited using the first processing head in step 602 is limited to the extent that the second processing head used in step 606 can reach sufficiently far inside the work-piece 902.

However, by using both the first and second processing heads a plurality of times, thereby creating the article in stages, it is possible to build up larger work-pieces which have a smoothed inside surface.

Thus, in the example of FIG. 19 it can be seen that once the second processing head has been finished with in step 606, the first processing head is again used a further four layers 904a-d are deposited on top of the work-piece 902. Then the second processing head is again used in step 606 and both the internal and external surfaces of the new layers 904a-d are processed to generate work-piece 906.

Embodiments, in which the internal surfaces are smoothed in this manner may find utility applications in which a gas, a liquid, or other fluid or fluidized material flows through work-piece 906 since it will be appreciated that smooth internal surface can lead to a better fluid flow. Examples where such a structure may be useful include fuel lines, hydraulic lines, cooling channels, flow tubes or the like.

The skilled person will also appreciate that it would be possible to provide further processing head changes so as to provide a change of macro or micro material around the inner surface region of each of the layers 900a-d, 904a-d, etc. Additionally a substantially smoother internal surface may be achieved by the use of different size deposition heads without machining where that is deemed more appropriate.

FIG. 20 is used to explain a further example of how the process of FIG. 16 might be utilised.

In step 602, a first material is deposited. In the example of FIG. 20a, the material is deposited as half a cylinder 1000 in a first material. This cylinder 1000 will be a sacrificial material as described hereinafter.

In the second processing step a further material 1002 is deposited over the sacrificial material 1000. Thus, the sacrificial material 1000 supports the arch 1004 so that the arch 1004 can be fabricated and thereby, the sacrificial material 1000 provides support for material deposited in latter processing steps. Once the second processing head has finished and the further material 1002 has solidified, etc. the sacrificial material 1000 can be removed. The skilled person will appreciate that further processing steps may be completed before the sacrificial material 1000 is removed.

In such embodiments, the portion of material 1002 may any suitable material for acting as a support. However, the portion of material 1002, which may be thought of a support material, may typically be a soluble polymer material or a loosely bonded/confined particulates or powder. It may be in a solid part filling the void or may be created as hollow self-supporting structure according to the limitations known in the art of directed energy deposition. For example a support structure could be made in a form that resembles cathedral like arches. It could also be made in such a way that it is easily removable by machining.

FIG. 21 provides a further example in which a support, or sacrificial, material is deposited to facilitate fabrication or repair of the underlying article. Here the article being fabricated is a turbine blade 1100. At a lower portion of the turbine blade there is a fir tree root portion 1102 which is difficult to hold during fabrication steps.

As such, some embodiments are arranged to encase this fir tree root portion 1102 within a block of sacrificial material 1104 (shown here in dotted outline). This sacrificial material 1104 could then be clamped in order to hold the turbine blade 1100 during subsequent steps. Thus, the sacrificial material 1104 provides a temporary, sacrificial, material which aid physical location of the work piece.

It will be appreciated that components may benefit from being supported at more than one point. Thus, in the context of FIG. 21, one embodiment provides a further portion of sacrificial material 1106 toward the end region opposite the fir tree root portion 1102. This further portion 1106 allows the blade 1100 to be held at two points at the regions of sacrificial material 1104, 1106 and the blade 1100 is protected from damage by the clamping means (such as a vice, or the like).

The skilled person will appreciate that although the example of a turbine blade has been used any other part could be so treated.

In some embodiments, a processing head may be used to provide a protective material arranged to protect a surface region of the work-piece. As with the support material, the protective material may (or may not) be a sacrificial material which is removed later in the fabrication of the article.

In yet further embodiments, as briefly referred to above, a processing head may be used to inspect an article. In such embodiments, the processing head may comprise any one or more of the following: image recording apparatus; lighting; touch probes; 3D surface and volumetric scanners; photogrammetry systems, sensors (such as oxygen sensors; thermal sensors; thermal cameras); eddy current generators; ultrasound transducers (for air, gel, and liquid coupled); electromagnetic wave generators or the like. Inspection data can be transferred from the processing head to the controller and from the controller to the processing head to control the inspection.

Thus, it will be seen from the foregoing that embodiments of the invention provide a variety of processing steps that may be applied to a work-piece. The skilled person will appreciate that a feature described in relation to any one embodiment may be used, mutatis mutandis, with any of the other described embodiments.

Some embodiments may flush a processing head. Such embodiments are advantageous because they help to ensure that the processing head is clean for its next use and help to avoid contamination of materials. Further, such embodiments help prevent wear to components through particles of material left within and/or on a processing head. In particular, in the embodiment being described, as a processing head is returned to the tool changer 308 is flushed with compressed air. In other embodiments other gases (eg an inert gas such as nitrogen or the like) might be used.

In one particular embodiment, there comprises four material feeds from the supply-unit 414 to the processing head 400. Other embodiments may have fewer or more material feeds used one at a time or in combination to provide in-process alloying. However, four feeds can be used to provide flexibility in how material is delivered from the supply-unit 414 to the processing head 400 and can be used to improve the speed with which a material change can be made and also to reduce the chances of contamination.

In one example, material of a first kind may be fed to the processing head 400 using two feeds. Then, it is desired to switch materials and so flow of material is stopped, or at least diverted, using a by-pass circuit, away from the processing-head 400. In the embodiment being described it has been found advantageous to divert material back to a hopper so that it is not wasted, thereby collecting media that is flushed/diverted from the processing-head. Here diversion rather than stopping the feed is helpful to ensure that pressures within the material feed are not raised too greatly.

Once the first material has been diverted (ie stopped from entering the processing head), the processing head is flushed with air and subsequently the two feeds not previously used are now used to supply a second material to the processing head. Such an embodiment is advantageous as it allows the supplied material to be switched from the first material to the second material quickly without the need to change processing heads 400 or change supply-units 414 whilst ensuring that no contamination of the materials occurs.

Various actions may be performed to assist changing from a first processing head to a second processing head.

In addition, and in the embodiment being described, parameters associated with the processing head to be used are loaded for use into the controller 306. Thus, with reference to FIG. 16, then as the first processing head is changed for the second processing head then at some point during the change between the two heads parameters associated with the second processing head are loaded for use into the controller 306.

A wide variety of processing parameters are stored for each deposition head including powers, feed speeds, gas flows, etc. and rates of change for each of these triggered by geometry requirements. These settings may be stored in database tables in a separate controller and called up as needed or they may be fully integrated into the machine tool controller and called using custom M-codes or other suitable signals. In some cases parameters for deposition heads may be used with functionality in the controller already associated with conventional cutting tools such as offsets. Embodiments may re-purpose the parameters stored in relation machining heads (eg a milling head or the like) to allow those parameters to be used with non-machining processing heads (such as deposition heads, probe heads and the like). For example, at least one of the following parameters may be stored for a processing head:

Tool length offset for each processing head length. Typically tool length is measured along what would be termed the Z-axis, which in the embodiment described in relation to FIG. 13 is along the line XX. It will be appreciate that most machine tools 300 have a parameter, often called a G-code, used to adjust the origin for the measured and stored the length of a bit, or other material remover. This parameter may be used to store the length of the processing head. Embodiments which store the length of the processing head are advantageous in that they can reduce the chances of the processing head having a collision with the work-piece 304. Embodiments may adjust the origin for the processing head to allow the processing head to be moved between a plurality of work-volumes at the same machine-tool 300. This parameter allows adjustment to be made to the origin of the machine-tool 300 to offset the datum for fixtures on the table, such as when there are two vices on the CNC table (eg two work-volumes). In the embodiment being described the parameters are used to record any deviations from centre-line (fine tuning to arrange all processing-heads to be used by the machine-tool 300 on the centre-line and/or in some cases for an intended offset).

The fixture offset can be used to make fine adjustments to ensure that the head position is kept substantially on the centre line of the spindle, or to specify intentional offsets from said centre-line. These offsets would typically be referred to as being in the X or Y axis, which in the embodiment of described in relation to FIG. 13 would be perpendicular to the line XX.

In some embodiments, including the one being described, the tool length stored may be modified or compensated such that the processing head length is increased beyond its physical length to include the designed stand-off distance of the processing head from the build surface (ie the surface of the work-piece 304). Here the stand-off distance is the required distance between the processing head and the work-piece 304 and may be adjusted to manipulate the deposition width.

In this embodiment, the controller 306 is arranged to vary the stand-off distance, and therefore to vary the stored length of the processing head, in order to vary the distribution of the laser beam power that is imparted on to the work-piece 304. The skilled person will appreciate that as the laser is moved toward or away from the work-piece then it will move into or out of the nominally engineered focus. Accordingly, using a processing head length which includes the stand-off distance can allow the focusing of any energy source provided by the processing head, which in the embodiment being described is the laser.

Some embodiments, may measure the amount of back reflection of the laser from the surface of the work-piece 304 and aim to minimise this amount; as such, the processing head is arranged to measure energy returned from the work-piece from energy directed (ie the laser), from the processing head, toward the work-piece. It will be appreciated that once a laser is focused then maximum power will be coupled into the work-piece 304 and that therefore, the amount of laser light reflected from the surface will be a minimum. This process of determining the ideal focus may be a stored routine which moves the head through a range of stand-off distances to establish the ideal focus and then the optimised outcome of the process can be stored in the CNC tool length tables as described above, or otherwise.

Furthermore, any processing head where the deposition or processing point is not on the spindle centerline can be stored as a fixture offset and called when the head is loaded into the spindle, thus re-purposing another standard CNC feature to accommodate the use of multiple heads.

Further, embodiments may store further parameters for a processing head. For example, parameters may be stored that determine the flow rate of any media 424, flow rate of any shielding gas, or the like; determine the power of any energy source (such as laser 416). The parameters mentioned in this paragraph may indicate how they should be varied according to motion of the processing head. For instance, it will be appreciated that as a processing head approaches a turn within its path then it is likely to need to slow down in order to achieve that turn. Accordingly, as the processing head slows it becomes advantageous for embodiments to reduce the flow of media 424; reduce the flow of shielding gas; and reduce the power of any energy source (eg laser 416).

Some embodiments may use a processing head 1200 which use mechanical means, such as a syringe 1202 or one or more Archimedes screws (not shown), to eject or extrude material 1204 from the head 1200. Such embodiments may work with a material feed from the supply-unit 414 or may additional supply media from a reservoir within the processing head 1206.

Some embodiments may use the spindle rotation (of the machine tool) to directly control the amount of material extruded. For example in the processing-head 1200 of the Figure being described which uses a syringe-based deposition, the plunger or other means for causing displacement in the syringe 1202 is coupled to the spindle with the tool holder and thereby commands to control the spindle motion changes the displacement which controls the deposition rate.

In one embodiment there are one or two Archimedes screws which are arranged to interact to plasticise a material (typically by shearing the material after the manner known in injection moulding), typically a polymer, within the processing head. The energy to rotate the screws may come directly from the spindle rotation. A heater can additionally be provided in order assist plasticising of the material. The heater may be powered by electricity generated from the spindle motion.

In one embodiment, the processing head is arranged to sense the spindle speed of the machine tool to which it is attached and to use that spindle speed to control the mechanical means within the head. For example a transition from a first speed of rotation to a second speed of rotation may indicate that flow should start. A transition from a high speed to a low speed may indicate that flow should cease.

Other embodiments may use further speeds of rotation in order to pass further information to the processing head.

FIG. 23 illustrates a further embodiment in which a processing head 1300 is positioned above an article that is being inspected 1302. This article may still be in the process of being manufactured and an inspection step may be performed as part of the process described in relation to any of the Figures above. The article 1302 could also be a finished article to be inspected.

FIG. 23 shows a fluid 1304 being ejected from the processing head 1300 and impacting upon a surface of the article 1302. In the embodiment of FIG. 23, the fluid is a cooling fluid typically used by the machine tool in which the processing head is mounted to cool an article being milled, drilled, or similarly processed. Thus, it will be seen, as illustrated in the Figure, that the fluid sprays away 1306 from the surface 1302. To facilitate the communication of the cooling fluid to the article, a channel 1308 is provided along a central region of the processing head 1300. The channel is arranged to ensure that the fluid 1304, as far as possible, has a laminar flow since turbulence within the fluid flow can reduce the coupling to the article 1302.

In some embodiments, the fluid 1304 is through spindle coolant.

Nonetheless the fluid 1304 provides sufficient coupling for an ultrasound transducer 1310 provided within the channel 1308 and in communication with the fluid 1304 flowing therein for ultrasound transmitted by the transducer 1310 to be couple to the article 1302.

Thus, embodiments as described in relation to FIG. 23 can be used to inspect articles 1302 using ultrasound. The skilled person will appreciate that such inspection may be useful in determining the presence of voids and the like within the article 1302.

In other embodiments, the fluid may be deposited onto the surface and latterly used by a processing head to couple that processing head to the part to make an inspection, such as an ultrasonic inspection, using that fluid as a coupling medium. Where a CNC machine is equipped with flood coolant capability and the coolant is sufficiently clean it is desirable to use it as the coupling medium, however where it is not fit for purpose another fluid can be delivered. The processing head making the inspection may be the same or different to the processing head that deposits the fluid. Here the fluid may be a gel or the like. The gel may be termed a sacrificial material as it does not end up in the final article and used as part of the inspection process.

An alternative processing head 1700 is shown in FIG. 27 having a 1702 in the form of a chisel. A surface of the work piece can be treated with the chisel tip to reduce stress in the work piece or a part of the work piece. The chisel tip may be kept stationary or may be moved by movement of the spindle. Alternatively they can be actuated by mechanical or ultrasonic means which can be provided within the processing head.

Figure 29A:
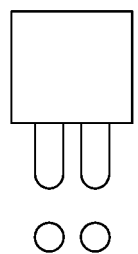
Figure 29B:
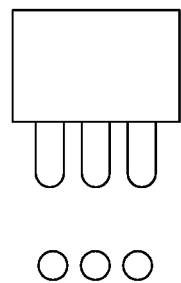
Figure 29C:
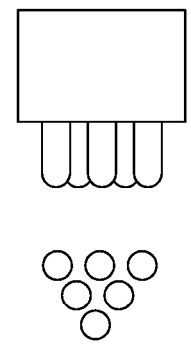
Figure 29D:
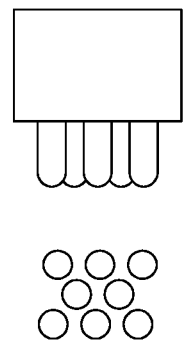

In FIG. 28 the processing head 1800 has a tip in the form of a pin 1802. The pin can be used to relieve stress and strain, particularly tensile stress, in the work piece. Alternative configurations of the tip of a processing head are shown in FIGS. 29a to 29d. The tip may have one, two, three or more pins. Arrays of pins can be used as can be seen in FIGS. 29c and 29d. The controller can choose a head with a particular arrangement of pins to apply pressure to the required part of the work piece and the arrangement selected is suited to the geometry of the work piece. Alternatively, the selection of heads can be pre-determined using planning software ahead of time such as with CAM software.

In FIGS. 29a to 29d the pins have a circular cross section but the skilled person will appreciated that the pins may alternatively have rectangular, hexagonal, square or other cross sections. Such cross sections may be used if an array is required in which there are not gaps or overlaps. The processing head is actuated to impact upon or apply pressure to the work piece. This process is referred to as peening. The application of pressure relieves tensile stresses and applies compressive stresses to the work pieces so improving the characteristics of the work piece. The force results in material compression, which in many materials contributes to better fatigue life and is less susceptible to propagate cracks, with improved resistance to stress corrosion, corrosion fatigue, and cavitation erosion. It will be appreciated that a person skilled in the art will see the peening method shown in these illustrations as interchangeable with all peening varieties including shot, hammer, flail (roto), vibro, tup, dot, needle, ultrasonic, micro, nano, and laser shock peening.

Figure 30A:
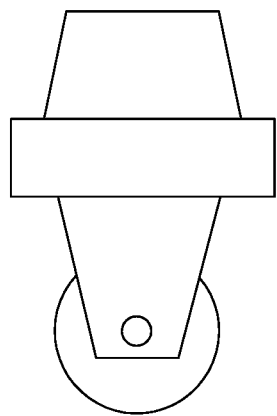
Figure 30B:
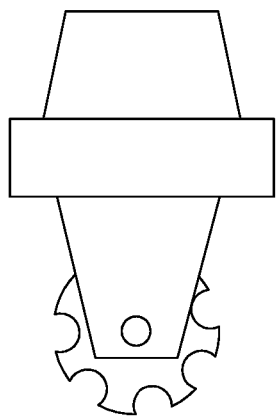
Figure 30C:
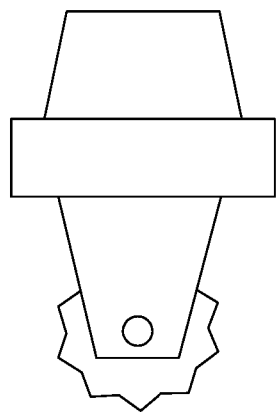

Alternative heads that can be used to needle or ultrasonically peen the surface of the work pieces are shown in FIGS. 30a to 30e. FIG. 30a shows a head having a continuous wheel or roller and can be caused to apply a continuous pressure. The discontinuous roller in FIGS. 30b and 30c can be used to apply pressure intermittently and may be preferred to reduce the rigidity required of the machine tool. It is desirable that the machine tool or processing head be supplied with a force feedback mechanism to apply a desired amount of pressure to the work pieces which can be recorded and used in a metrology loop which monitors feedback (including force and work piece temperature gradients) and adjusts the process ideally in real time to ensure consistent treatment of each work piece.

Figure 30D:
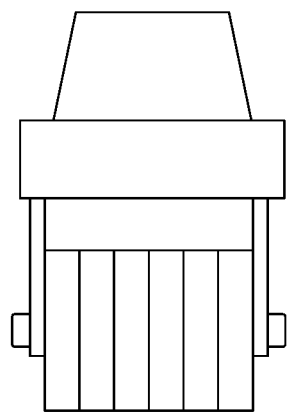
Figure 30E:
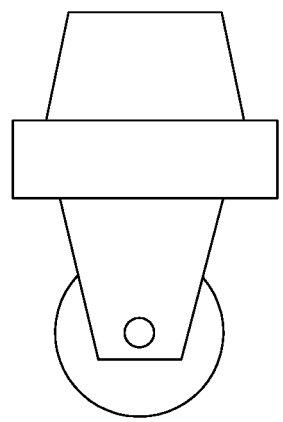

FIGS. 30d and 30e show variations in which an array of wheels or rollers are used. The skilled person will appreciate that the rollers can be arranged to have individual travel so that the rollers can conform to a surface as they travel over it.

FIG. 31 shows an embodiment in which the processing head comprises sets of arrays of rollers. A pair of arrays are arranged to rotate about an axis parallel to the spindle and an array of rollers is arranged to rotate about an axis perpendicular to the axis of the spindle. As can be seen the rollers are arranged to act on an upper surface and side surfaces of a wall part created on the work piece.

In FIG. 32 is a side view of the processing head if FIG. 31 in which the set of rollers arranged to rotate about the spindle axis can be seen more clearly.

FIGS. 33 to 34 show variations of the embodiment of FIG. 13 and the same reference numerals have been used for the same features. In FIG. 33 a roller is combined with a laser cladding head. This allows for hot rolling of the material immediately after deposition on the work piece. Hot rolling of the work piece can have benefits for the microstructure of the deposited material and can also reduce the amount of force required to affect the material properties. As referred to above the manifold and the processing head are arranged to supply a cooling fluid to internal passageways in the head and to the wheels or rollers to prevent overheating. The roller is indexed around the spindle to ensure that the rolling action is substantially parallel with the direction of deposition.

FIG. 34 shows a processing head having a laser deposition head and peening pins integrated around the head. This arrangement allows hot peening, hammering, scarifying, and chiselling of the work piece. As before, coolant is supplied to the processing head and is circulated around the head to keep the pins cool. The peening is carried out by striking the surface, of the part which is hot, akin to the use of a blacksmith's hammer, and the impact of the pins on the heated metal in a softened state is maximised while the force is reduced compared to cold peening. The action of the pins is mechanical and is controlled by the processing head but alternatives such as delivery of the action by the machine tool or by the use of ultra sound can be envisaged. As with the previous head, it may be indexed around in order to add pressure in the wake of the heated area from the laser. The pins can be attached such that they could be displaced with a couple of mm of travel once the appropriate force was exerted by them. To enable some travel of the head the pin actuation can be countercyclical to a laser pulsing frequency so as not to defocus the laser if the motion of the pins is dependent on the Z axis of the CNC machine. It will also be appreciated that a laser heat source has been shown here as an example, but an arc, electron beam, microwaves, induction heaters, or the like could also be useable.

When forces are high and especially when the forces are not substantially symmetrical around the spindle centre line it is desirable to have anti-rotation/torque blocks and/or thrust assist collars and/or cowl mounts for the spindle as is known in the art to assist with 90 degree or other angle heads. In some cases it will be desirable to rotate the spindle when undertaking pressure, impact, or stress relieving operations to help prevent bearing surfaces from being damaged (such as by dimpling) due to non-uniform loads.

It will be appreciated that the peening heads described above can be used independently of the laser heads. Peening is then carried out on work piece when it is cold or at least not so hot.

FIG. 35 is a variation of the processing head of FIG. 34 and has a processing head having a laser deposition head and peening pins. The same reference numbers are used for the same features. The head is shown in more detail in FIG. 36. As in the head of FIG. 34 the peening pins are integrated around the head. However in the head of FIG. 34 the head is indexed around to follow a line of deposition, in this head different pins can be activated in order to add pressure in the wake of an area heated by the laser. The activation may be by actuation of the peening pins or by a length increase of individual pins so that the contact the surface before the other pins. In another arrangement the pins are attached to the processing head such that they can be displaced by a few mm of travel once an appropriate force has been exerted on the pins. It has been found that it is desirable to make the pin actuation countercyclical to a laser pulsing frequency which prevent s the laser defocusing which motion of the pin is dependent on the z axis of a CNC machine. It will be appreciated that the energy source may be exchanged for an alternative energy source such as an arc, an electron beam, microwaves, induction heaters, or other equivalent energy sources.

FIGS. 44 and 45 show alternative processing heads adapted to carry out two processes. The heads in FIGS. 44 and 45 apply a polymer extrusion to a work piece. In FIG. 44 processing head comprises a polymer extrusion head 4400 attached to the tool holder 4402. The extrusion head comprises a body 4404 and a nozzle 4406. The nozzle 4406 is surrounded by a compacting frame 4408. Heaters 4410 are located around the body 4404 of the extrusion head. A screw 4412 connected to the tool holder 4402 rotates within a bore 4414 of the head to move injection moulding pellets 4416 from the media feed 4418 towards the nozzle. As the pellets move down the bore 4414 the pellets are melted by heat from the heaters 4410 around the body. As the pellets melt the screw 4412, which is driven by the spindle, plasticises the pellet material ready for extrusion from the nozzle. As the material is being extruded from the nozzle 4406 the compacting frame 4408 reciprocates up and down applying pressure onto the soft material 4420 in order to achieve full density of the extruded material.

FIG. 45 illustrates a modification of the head of FIG. 44. The same reference numerals are used for the same features. In FIG. 45 an additional feature is that a continuous fibre 4422 is fed into the head in a co-axial direction. The fibre 4422 feeds through the melted polymer and is extruded through the nozzle 4406 with the extruded polymer 4420. A knife 4424 is provided that operates to cut the fiber periodically once it has been extruded. The knife can cut the fibre when it is finished with each continuous feed. In other embodiments the fibre is chopped periodically to produce a chopped fibre reinforcement of the extruded material.

It will be appreciated that in an alternative arrangement the polymer and the fibre could be fed from separate nozzles on the same head or could be applied by different heads with the processing heads being switched between the deposition steps.

The skilled person will also appreciate that the screw does not need to be connected to the tool holder but may be located in the receiving dock or even in the supply dock. The polymer may be melted in the machine tool and merely fed to the processing head by means of a heated tube connected or connectable to the body of the processing head.

FIG. 37 shows a prior art deposition processing head in which an electrode 3701 supplies energy to the work piece 3702 and a wire 3703 is fed into the melt pool 3704. Typically this is done just ahead of the electrode since feeding the wire ahead of the electrode prevents the wire from snagging on the substrate. The area generally indicated at 3705 is the dilution layer and heat affected zone.

FIG. 38 shows a novel deposition head comprising an electrode 3801 providing energy to a work piece 3802 and a media feed 3803. The head comprises means for generating an integral electromagnetic field 3804 which is arranged to bend an arc 3805 extending between the electrode and the work piece.

The electromagnetic field 3804 bends the arc 3805 to be slightly ahead of the electrode 3801. The media feed 3803 in the form of a wire can be feed substantially parallel to the electrode so facilitating automation. The wire always feeds straight into the weld pool 3806 and is unaffected by changes in the feed direction. Should it be necessary the bend of the arc can be controlled by changing the electromagnetic field applied to the arc. The electromagnetic field 3804 can be controlled by changing the mode of the electricity used to induce the field or can be changed by controlling a position of the magnet or magnets.

FIG. 39 illustrates the control that can be achieved in the location of the melt pool using the head of FIG. 38. The position of the electrode was not changed but the polarity of the field powering the electromagnet was reversed. In this case the weld pool location was moved by approximately 10 mm. The displacement of the weld pool allows the wire to be fed co axially with the electrode. It will be appreciated that the arc may be intentionally shifted to an alternative position other than a co- axial location of the wire if so desired.

FIGS. 40 and 41 illustrate processing heads 4001 that can hold various components 4002. In FIG. 41 the components 4002 are held inside the processing head 4001 in a reservoir or storage facility 4004 and the head 4001 is arranged to dispense the components 4002 as required. In the embodiment of the FIG. 41 the processing head 4001 can be replenished through a dock 4006 as schematically indicated at 4008.

FIG. 42 illustrates an alternative processing head having a body 4600 and a nozzle 4602. The processing head is connectable to the carriage and has a receiving manifold 4604 located on a side face 4606 of the body. The receiving manifold 4604 comprises an opening 4608 having a closure 4610 arranged to be moveable in a track 4612 between a closed position in which the closure is over the opening and an open position 4614 as can be seen in FIGS. 42 and 43. An actuator, not visible, is arranged to move the closure form the closed to the open positon in the docking operation and to move the closure from the open to the closed positon in the undocking operation. In the closed position the interior of the processing head is sealed from the environment. In the open position docking of power and media supplies can be arranged through the opening. In the docked position the path for power and media supply through the opening and into the processing head is sealed from the environment.

It will be appreciated that a number of different concepts have been described herein. The skilled person will appreciate that these may be used alone or in combination with the other concepts described herein.

The invention claimed is:

1. A machine tool comprising:
   a plurality of interchangeable heads, wherein the plurality of interchangeable heads comprise one or more processing heads for addition or inspection of material on a workpiece and one or more machining heads for removal of material from the workpiece;
   a clamp to temporarily hold one of the plurality of interchangeable heads; and
   a chamber, wherein the chamber comprises a sealed portion, the workpiece is to be positioned within the sealed portion of the chamber, and the sealed portion of the chamber is arranged to be flooded with and hold an inert gas to create a reduced oxygen content level within the sealed portion of the chamber and submerge at least a portion of the workpiece in the inert gas, wherein the chamber further comprises a waste extractor to remove waste generated within the sealed portion of the chamber from the chamber while preventing expulsion of the inert gas from the chamber to maintain the reduced oxygen content level within the sealed portion.

2. The machine tool of claim 1, wherein a first processing head of the plurality of interchangeable heads is arranged to carry out two or more different processing actions.

3. The machine tool of claim 1, wherein a first processing head of the one or more processing heads is arranged to carry out deposition of the material onto the workpiece.

4. The machine tool of claim 3, wherein the first processing head is further arranged to carry out at least one additional processing step.

5. The machine tool of claim 3, wherein the deposition is carried out by extrusion.

6. The machine tool of claim 1, wherein a first processing head of the one or more processing heads is arranged to deposit onto a workpiece and to pressure treat a workpiece simultaneously.

7. The machine tool of claim 6, wherein the pressure treatment is intermittent.

8. The machine tool of claim 1, wherein a first processing head of the one or more processing heads is arranged to carry out two processes simultaneously that are selected from one of the following combinations:
   applying heat and carrying out removal of material;
   applying induction heating and using laser processing;
   deposition of material and inspection of deposited material;
   deposit material and move a workpiece;
   move a workpiece and carry out another process;
   processing of a workpiece and inspection of the workpiece;
   preparative processing and processing; and
   processing and post processing treatment; and
   performing a first measurement of the workpiece and performing a second measurement of the workpiece.

9. The machine tool of claim 1, wherein a first processing head of the one or more processing heads is arranged to deposit a first heated material and to co extrude a second material with the first material.

10. The machine tool of claim 9, wherein the first processing head further comprises a cutting means arranged to cut the second material.

11. The machine tool of claim 1, comprising a tool changer configured to store a number of the one or more processing heads.

12. The machine tool of claim 1, wherein one of the one or more machining heads is arranged to be moveable in at least two axes when held in the clamp.

13. The machine tool of claim 1, wherein the sealed portion comprises a volume enclosed by the chamber.

14. The machine tool of claim 1, wherein the machine tool further comprises an integral docking system, arranged to supply processing material to at least a particular one of the one or more processing heads.

15. The machine tool of claim 14, wherein the particular processing head comprises a receiving docking manifold, and the machine tool has a supply manifold arranged to connect with the receiving manifold on the particular processing head.

16. The machine tool of claim 15, wherein the machine tool includes a carriage configured to engage the particular processing head, and the carriage is arranged to be moveable along a y axis, and wherein the receiving docking manifold of the particular processing head is arranged to be alongside or adjacent to the carriage.

17. The machine tool of claim 1, further comprising:
   a first tool changer to store the one or more machining heads;
   a second tool changer to store the one or more processing heads, wherein the second tool changer is separated from the first tool changer.

18. The machine tool of claim 17, wherein the second tool changer is controlled to prevent cross-contamination with the workpiece or tools used from the first tool changer.

19. The machine tool of claim 17, wherein the first tool changer corresponds to one side of the machine tool and the second tool changer corresponds to a further side of the machine tool.

20. The machine tool of claim 1, further comprising a device configured to hold one of the one or more processing heads, and wherein the one of the one or more processing heads is arranged to be moveable in at least two axes when held by the device.

* * * * *